United States Patent
Ng et al.

(10) Patent No.: US 9,871,627 B2
(45) Date of Patent: Jan. 16, 2018

(54) METHODS TO SUPPORT INTER-ENODEB COMP

(71) Applicant: Samsung Electronics Co., Ltd., Suwon-si, Gyeonggi-do (KR)

(72) Inventors: Boon Loong Ng, Dallas, TX (US); Young-Han Nam, Plano, TX (US); Thomas David Novlan, Dallas, TX (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 740 days.

(21) Appl. No.: 14/148,467

(22) Filed: Jan. 6, 2014

(65) Prior Publication Data

US 2014/0192734 A1 Jul. 10, 2014

Related U.S. Application Data

(60) Provisional application No. 61/750,701, filed on Jan. 9, 2013.

(51) Int. Cl.
 *H04L 5/00* (2006.01)
(52) U.S. Cl.
 CPC .......... *H04L 5/0035* (2013.01); *H04L 5/0042* (2013.01); *H04L 5/0051* (2013.01); *H04L 5/0053* (2013.01); *H04L 5/001* (2013.01)
(58) Field of Classification Search
 CPC .. H04W 72/042; H04L 5/0035; H04L 5/0042; H04L 5/0051; H04L 5/0053; H04L 5/001
 See application file for complete search history.

(56) References Cited

U.S. PATENT DOCUMENTS

| | | | |
|---|---|---|---|
| 2010/0031117 A1 | 2/2010 | Lee et al. | |
| 2010/0091678 A1* | 4/2010 | Chen | H04B 7/024 370/252 |

(Continued)

FOREIGN PATENT DOCUMENTS

CN    102598795 A    7/2012

OTHER PUBLICATIONS

International Search Report dated Apr. 22, 2014 in connection with International Patent Application No. PCT/KR2014/000205, 3 pages.

(Continued)

*Primary Examiner* — Melvin Marcelo

(57) ABSTRACT

A method of executing inter-eNB CoMP JT between a CoMP UE and multiple CoMP eNBs is disclosed. A first CoMP eNB constructs a first set of dynamic control information (DCI). The first set of DCI is independently constructed by the first CoMP eNB. The first CoMP eNB transmits the first set of DCI to the CoMP UE. The first set of DCI includes independent DL assignments allowing the first CoMP eNB to perform independent scheduling of a PDSCH associated with the first CoMP eNB. A second CoMP eNB constructs a second set of DCI. The second set of DCI is independently constructed by the second CoMP eNB. Furthermore, the second CoMP eNB transmits the second set of DCI to the CoMP UE. The second set of DCI includes independent DL assignments allowing the second CoMP eNB to perform independent scheduling of a PDSCH associated with the second CoMP eNB.

15 Claims, 11 Drawing Sheets

(56) References Cited

U.S. PATENT DOCUMENTS

| | | |
|---|---|---|
| 2011/0255486 A1 | 10/2011 | Luo et al. |
| 2011/0286398 A1 | 11/2011 | Chung et al. |
| 2011/0317637 A1 | 12/2011 | Kim et al. |
| 2012/0087273 A1 | 4/2012 | Koo et al. |
| 2012/0269140 A1 | 10/2012 | Nam et al. |
| 2013/0301434 A1* | 11/2013 | Krishnamurthy ..... H04L 1/0026 370/252 |

OTHER PUBLICATIONS

Written Opinion of International Searching Authority dated Apr. 22, 2014 in connection with International Patent Application No. PCT/KR2014/000205, 7 pages.

J. Lee et al., "Coordinated Multipoint Transmission and Reception in LTE-Advanced Systems", Technology Updates on LTE Advanced, pp. 44-50, Nov. 2012.

3GPP TS 36.211 V11.1.0 (Dec. 2012) 3rd Generation Partnership Project; Technical Specification Group Radio Access Network; Evolved Universal Terrestrial Radio Access (E-UTRA); Physical Channels and Modulation (Release 11) 108 Pages.

3GPP TS 36.212 V11.1.0 (Dec. 2012) 3rd Generation Partnership Project; Technical Specification Group Radio Access Network; Evolved Universal Terrestrial Radio Access (E-UTRA); Multiplexing and channel coding (Release 11)—82 Pages.

3GPP TS 36.213 V11.1.0 (Dec. 2012) 3rd Generation Partnership Project; Technical Specification Group Radio Access Network; Evolved Universal Terrestrial Radio Access (E-UTRA); Physical layer procedures (Release 11)—160 Pages.

3GPP TS 36.321 V11.1.0 (Dec. 2012) 3rd Generation Partnership Project; Technical Specification Group Radio Access Network; Evolved Universal Terrestrial Radio Access (E-UTRA); Medium Access Control (MAC) protocol specification (Release 11)—57 Pages.

3GPP TS 36.355 V11.0.0 (Sep. 2012) 3rd Generation Partnership Project; Technical Specification Group Radio Access Network; Evolved Universal Terrestrial Radio Access (E-UTRA); LTE Positioning Protocol (LPP) (Release 11)—117 Pages.

3GPP TR 36.819 V11.1.0 (Dec. 2011) 3rd Generation Partnership Project; Technical Specification Group Radio Access Network; Coordinated multi-point operation for LTE physical layer aspects (Release 11)—69 Pages.

3GPP TR 36.874 V1.0.0 (Sep. 2013)3rd Generation Partnership Project; Technical Specification Group Radio Access Network; Coordinated multi-point operation for LTE with non-ideal backhaul (Release 12)—14 Pages.

Partial Supplementary Search Report dated Jul. 27, 2016 in connection with European Application No. 14737776.6, 6 pages.

Catt, "Simulation Results for the CoMP Phase 1 Evaluations", 3GPP TSG RAN WG1 Meeting #65, R1-111365, Barcelona, Spain, May 9-13, 2011, 7 pages.

Foreign Communication from Related Counterpart Application; Chinese Patent Application No. 201480004405.0; Chinese Office Action dated May 24, 2017; 12 pages.

Communication from a foreign patent office in a counterpart foreign application, "Examination report No. 4 for standard patent application," Application No. AU 2014205861, dated Nov. 10, 2017, 6 pages.

* cited by examiner

METHODS TO SUPPORT INTER-ENODEB COMP

CROSS-REFERENCE TO RELATED APPLICATION(S) AND CLAIM OF PRIORITY

This application claims priority under 35 U.S.C. § 119(e) to U.S. Provisional Patent Application No. 61/750,701 filed on Jan. 9, 2013. Provisional Patent Application No. 61/750,701 is assigned to the assignee of the present application and is hereby incorporated by reference into the present application as if fully set forth herein. The present application hereby claims priority under 35 U.S.C. § 119(e) to U.S. Provisional Patent Application No. 61/750,701.

TECHNICAL FIELD

The present application relates generally to wireless communication systems and, more specifically, a wireless communication system including inter-eNodeB coordinated multi point joint transmission.

BACKGROUND

In Rel. 11, 3GPP standardized coordinated multi point (CoMP) technology for Long Term Evolution (LTE) allowing user equipment (UE) to receive signals from multiple transmission point (TPs) or eNodeBs (eNBs). Rel-11 inter-site CoMP was designed assuming ideal backhaul (e.g. fiber), where latency was negligible and the backhaul capacity was not an issue. Under the ideal backhaul assumption, it was feasible to implement a centralized controller/scheduler architecture where a centralized controller/scheduler was responsible for the scheduling decision of all TPs or eNBs participating in CoMP. It was also feasible to implement a distributed scheduler architecture in which case the ideal backhaul enables very tight coordination between schedulers of different sites.

SUMMARY

This disclosure provides a method and system for inter-eNodeB (eNB) coordinated multi point (CoMP) joint transmission between a CoMP user equipment (UE) and two or more CoMP eNBs.

In a first embodiment, a method of executing inter-eNodeB (eNB) coordinated multi point (CoMP) joint transmission (JT) between a CoMP user equipment (UE) and two or more CoMP eNBs is disclosed. The method includes that a first CoMP eNB of the two or more CoMP eNBs constructs a first set of dynamic control information (DCI). The first set of DCI is independently constructed by the first CoMP eNB. Furthermore, the first CoMP eNB transmits the first set of DCI to the CoMP UE. The first set of DCI includes independent downlink (DL) assignments allowing the first CoMP eNB to perform independent scheduling of a physical downlink shared channel (PDSCH) associated with the first CoMP eNB. The method also includes that a second CoMP eNB of the two or more CoMP eNBs constructs a second set of DCI. The second set of DCI is independently constructed by the second CoMP eNB. Furthermore, the second CoMP eNB transmits the second set of DCI to the CoMP UE. The second set of DCI includes independent downlink (DL) assignments allowing the second CoMP eNB to perform independent scheduling of a physical downlink shared channel (PDSCH) associated with the second CoMP eNB.

In a second embodiment, a method of executing inter-eNodeB (eNB) coordinated multi point (CoMP) between a CoMP user equipment (UE) and two or more CoMP eNBs is disclosed. The method includes that a CoMP UE is configured with a first cell radio network temporary identifier (C-RNTI) associated with a first CoMP eNB of the two or more eNBs. The CoMP UE is also configured with a second C-RNTI associated with a second CoMP eNB of the two or more eNBs. Additionally, the CoMP UE determines at least one of a CoMP UE specific search space for a physical downlink control channel/enhanced physical downlink control channel (PDCCH/EPDCCH), a scrambling of a cyclic redundancy check (CRC) of the PDCCH/EPDCCH for each eNB of the two or more eNBs, or a scrambling of a physical downlink shared channel (PDSCH) for each eNB of the two or more eNBs based on at least the first C-RNTI and the second C-RNTI.

In a third embodiment, a method of allocating physical resource blocks (PRBs) between at least a first coordinated multi point (CoMP) eNodeB (eNB) and a second CoMP eNB is disclosed. The PRBs are allocated such that a first set of one or more PRBs allocated for the first CoMP eNB does not overlap with a second set of one or more PRBs allocated for the second CoMP eNB. The first CoMP eNB and the second CoMP eNB are each participating in inter-eNB CoMP joint transmission (JT). The first CoMP eNB transmits a message to the second CoMP eNB. The message identifies an indicated set of physical resource blocks (PRBs) that the second CoMP eNB should not use to schedule data transmissions with a CoMP user equipment (UE) using the second C-RNTI. The second CoMP eNB selects the demodulation reference signal (DM-RS) ports for data transmission with the CoMP UE. The second CoMP eNB transmits data to the CoMP UE using PRBs which do not include the indicated set of PRBs In a fourth embodiment, a method of independently allocating physical resource blocks (PRBs) by a first coordinated multi point (CoMP) eNodeB (eNB) and a second CoMP eNB participating in inter-eNB CoMP joint transmission (JT) is disclosed. Prior to CoMP eNB JT participation, a first set of demodulation reference signal (DM-RS) ports configured for data transmission with a CoMP user equipment (UE) is predetermined for the first CoMP eNB. Furthermore, prior to CoMP eNB JT participation, a second set of demodulation reference signal (DM-RS) ports configured for data transmission with a CoMP UE is predetermined for the second CoMP eNB. The first CoMP eNB schedules data transmissions to the CoMP UE using the first set of DM-RS ports. The second CoMP eNB schedules data transmissions to the CoMP UE using the second set of DM-RS ports.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Embodiments of the present disclosure provide enhancements for an inter-eNB CoMP joint transmission (JT) scheme with a non-ideal backhaul where no centralized scheduler or no tight scheduler coordination is possible and where the latency is significant.

Figure 1:
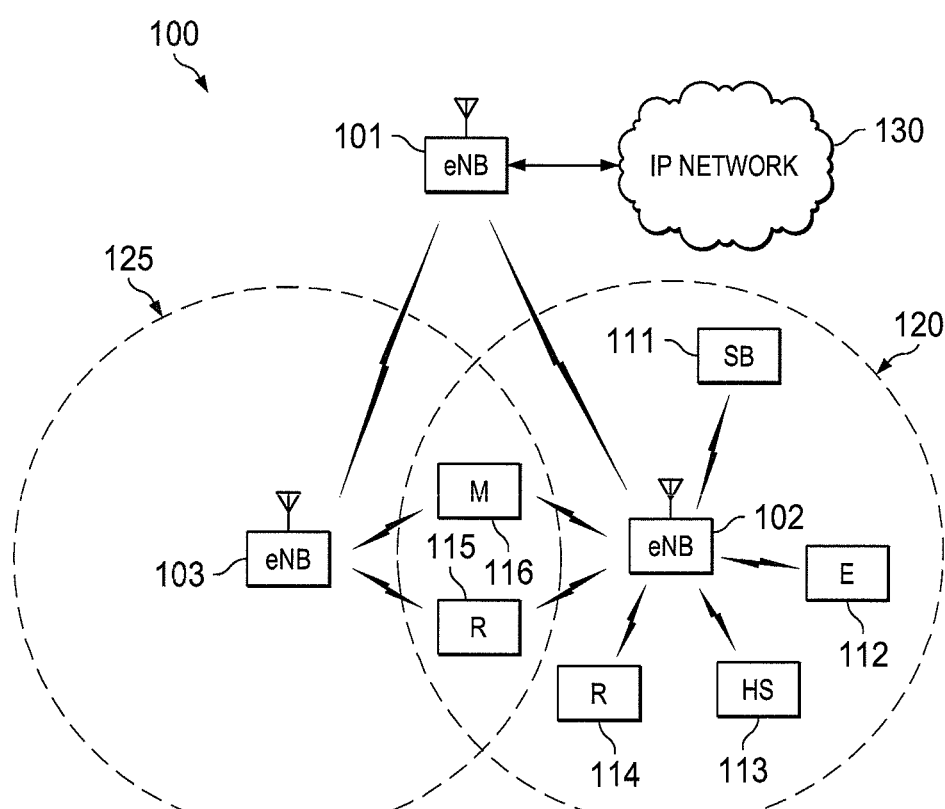
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, or other advanced wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions. As described in more detail below, one or more of eNB 101, eNB 102, and eNB 103 are configured to perform or support an inter-eNB CoMP JT scheme as described herein.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
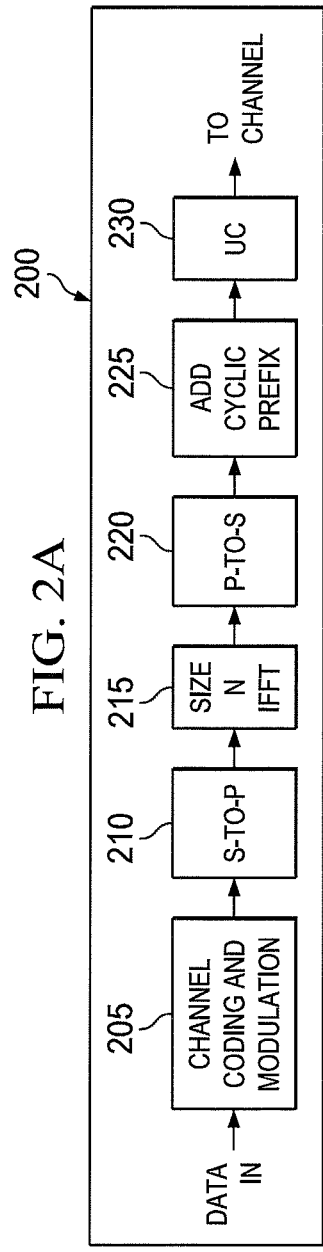
FIGS. 2A and 2B illustrate example wireless transmit and receive paths according to this disclosure.
Figure 2B:
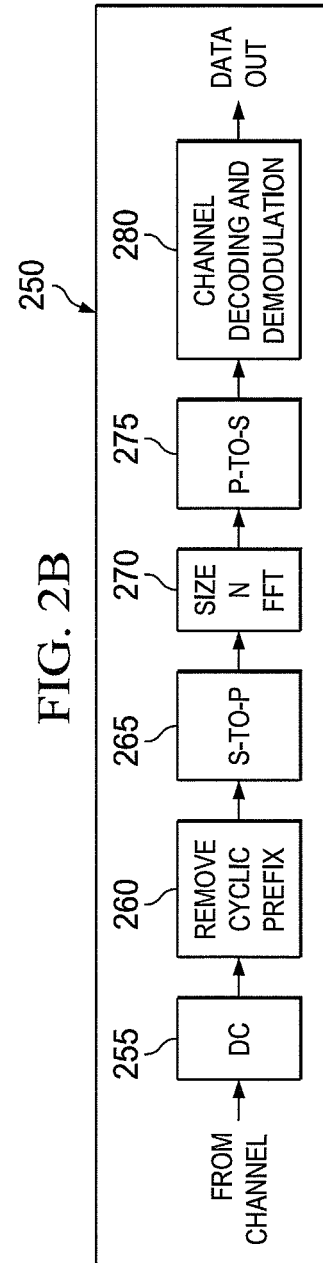

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to perform or support an inter-eNB CoMP JT scheme as described herein.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel symbol streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architectures could be used to support wireless communications in a wireless network.

Figure 3:
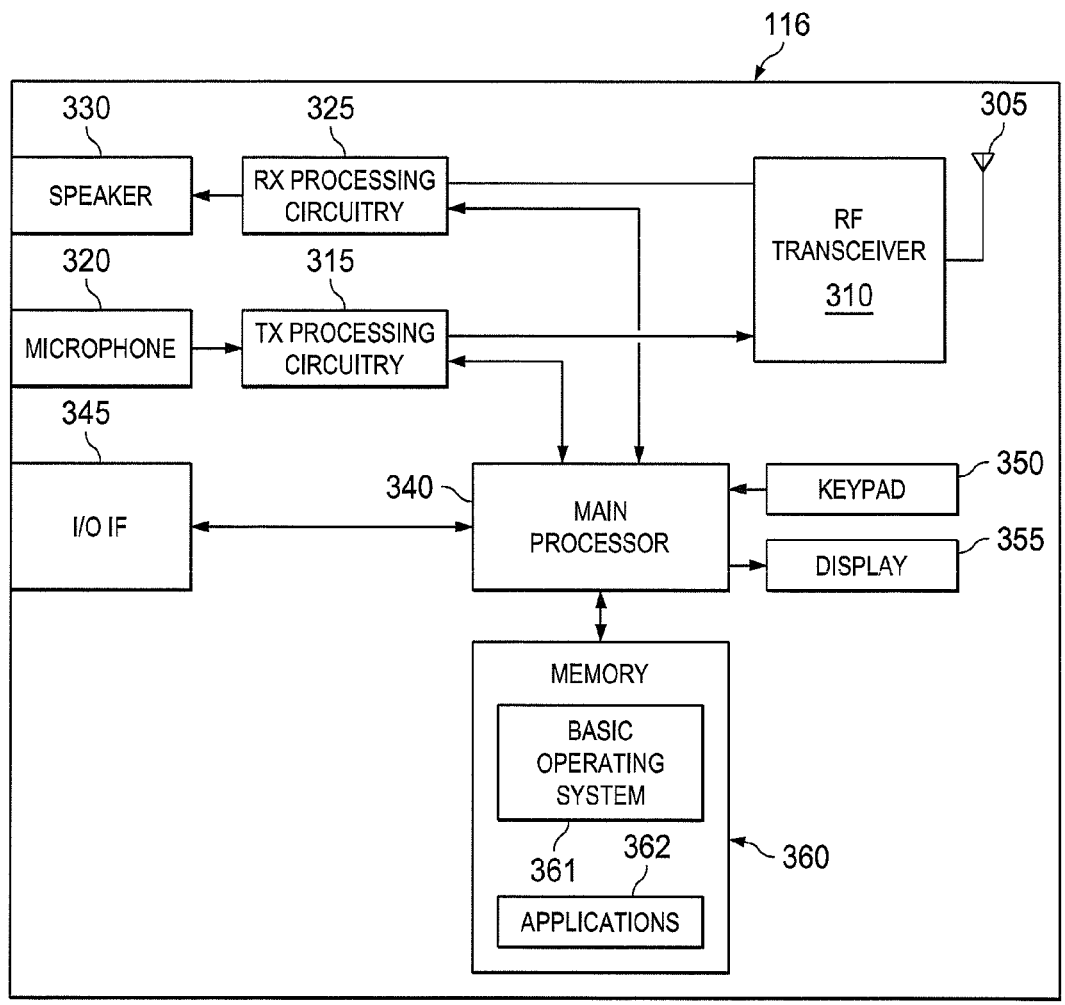
FIG. 3 illustrates an embodiment of a UE according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, and a memory 360. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for an inter-eNB CoMP JT communications as described herein. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main controller 340.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4:
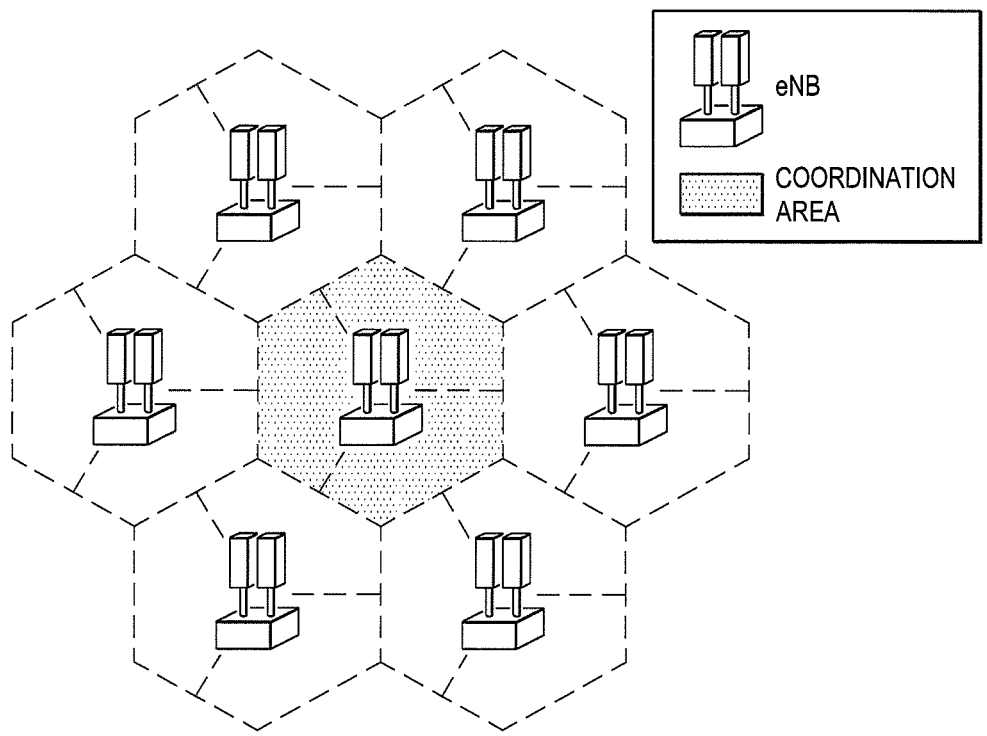
FIG. 4 illustrates an embodiment of a homogeneous network with intra-site CoMP according to this disclosure.
Figure 5:
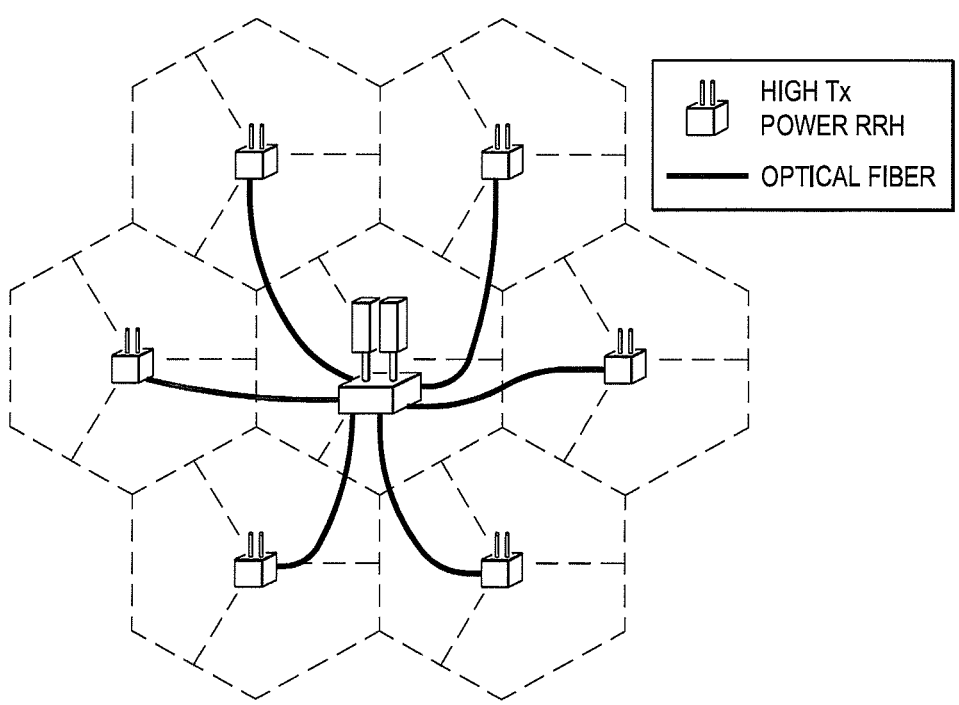
FIG. 5 illustrates an embodiment of a homogeneous network according to this disclosure.
Figure 6:
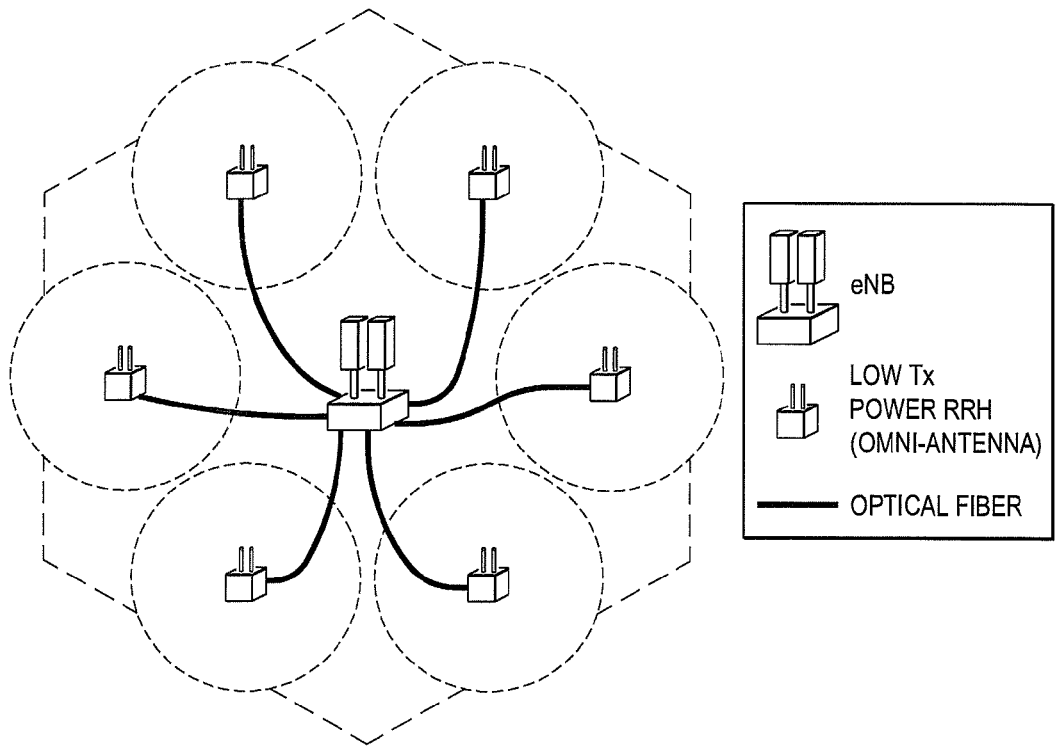
FIG. 6 illustrates an embodiment of a heterogeneous network according to this disclosure.

In Long Term Evolution (LTE) Rel-11, the 3rd Generation Partnership Project (3GPP) has standardized the technology (Coordinated MultiPoint or "CoMP") that allows the user equipment (UE) to receive signals from multiple transmission points (TPs) under several deployment scenarios:

Scenario 1: Homogeneous network with intra-site CoMP, as illustrated in FIG. 4;
Scenario 2: Homogeneous network with high Tx power remote radio heads (RRHs), as illustrated in FIG. 5;
Scenario 3: Heterogeneous network with low power remote radio heads (RRHs) within the macrocell coverage where the transmission/reception points created by the RRHs have different cell identifiers (IDs) from that of the macro cell as illustrated in FIG. 6; and
Scenario 4: Heterogeneous network with low power RRHs within the macrocell coverage where the transmission/reception points created by the RRHs have the same cell IDs as the macro cell as illustrated in FIG. 6.

The CoMP schemes that have been identified as the focus for standardization are:
Joint transmission (JT);
Dynamic point selection (DPS), including dynamic point blanking; and
Coordinated scheduling/beamforming, including dynamic point blanking.

Rel-11 inter-site CoMP was designed assuming ideal backhaul (e.g. fiber), where latency was negligible and the backhaul capacity was not an issue. Under the ideal backhaul assumption, it was feasible to implement a centralized controller/scheduler architecture where a centralized controller/scheduler was responsible for the scheduling decision of all TPs participating in CoMP. It was also feasible to implement a distributed scheduler architecture in which case the ideal backhaul enabled very tight coordination between schedulers of different sites. An overview of 3GPP LTE Rel-11 CoMP can be found in Juho Lee et al, "Coordinated Multipoint Transmission and Reception in LTE-Advanced Systems", IEEE Communications Magazine, Vol 50, Issue 11, Page(s) 44-50, November 2012.

For Rel-12, additional enhancements for CoMP have been proposed to consider the non-ideal backhaul (e.g. microwave, copper), where the latency is significant. Assuming non-ideal backhaul where no centralized scheduler or no tight scheduler coordination is possible, the inter-eNB CoMP framework can be designed to support an inter-eNB CoMP JT scheme where each evolved Node B (eNB) participating as a TP in the CoMP transmission can independently schedule and transmit downlink shared channel (DL-SCH) data to a UE on the same carrier frequency.

For the rank statistics for Rel-11 CoMP DPS with ideal backhaul it can be useful to consider two observations. First, denote n-th TP as the TP with the n-th largest average DL received power. Table 1 illustrates a TP selection ratio. As such, the first observation is that the $1^{st}$ TP (the largest received power) can be selected most of the time for DPS. This implies that the channel condition from the first TP can be more favorable compared to the other TPs most of the time.

TABLE 1

TP selection ratio

| Traffic | UE dropping | $1^{st}$ TP | $2^{nd}$ TP | $3^{rd}$ TP |
|---|---|---|---|---|
| Full buffer | Clustered | 82.66% | 13.33% | 4.01% |
| | Uniform | 81.47% | 14.42% | 4.11% |
| FTP | Clustered | 89.24% | 9.17% | 1.59% |
| | Uniform | 87.32% | 10.75% | 1.93% |

Table 2 illustrates the rank statistics for each TP configured to target UEs assuming full buffer traffic and CoMP threshold of 6 dB and Table 3 illustrates the rank statistics for each TP configured to target UEs assuming FTP traffic with Resource Utilization (RU)=0.5 and CoMP threshold of 6 dB. As such, the second observation is that the UE can still be likely to enjoy rank 2 assignment from the TP with the largest average received power.

TABLE 2

Rank statistics for each TP configured to target
UEs (full buffer traffic, CoMP th. = 6 dB)

| UE dropping | Target TP | Rank 1 | Rank 2 | Rank 3 | Rank 4 |
|---|---|---|---|---|---|
| Clustered | $1^{st}$ TP | 20.00% | 80.00% | 0.00% | 0.00% |
| | $2^{nd}$ TP | 38.00% | 62.00% | 0.00% | 0.00% |
| | $3^{rd}$ TP | 57.02% | 42.98% | 0.00% | 0.00% |

TABLE 2-continued

Rank statistics for each TP configured to target
UEs (full buffer traffic, CoMP th. = 6 dB)

| UE dropping | Target TP | Rank 1 | Rank 2 | Rank 3 | Rank 4 |
|---|---|---|---|---|---|
| Uniform | $1^{st}$ TP | 21.00% | 79.00% | 0.00% | 0.00% |
|  | $2^{nd}$ TP | 37.60% | 62.40% | 0.00% | 0.00% |
|  | $3^{rd}$ TP | 57.41% | 42.59% | 0.00% | 0.00% |

TABLE 3

Rank statistics for each TP configured to
target UEs (FTP traffic with RU = 0.5).

| UE dropping | Target TP | Rank 1 | Rank 2 | Rank 3 | Rank 4 |
|---|---|---|---|---|---|
| Clustered | $1^{st}$ TP | 8.61% | 85.68% | 5.69% | 0.02% |
|  | $2^{nd}$ TP | 21.76% | 73.20% | 5.03% | 0.00% |
|  | $3^{rd}$ TP | 35.27% | 62.56% | 2.17% | 0.00% |
| Uniform | $1^{st}$ TP | 9.01% | 86.38% | 4.60% | 0.00% |
|  | $2^{nd}$ TP | 21.05% | 75.06% | 3.89% | 0.00% |
|  | $3^{rd}$ TP | 35.35% | 62.67% | 1.98% | 0.00% |

Inter-eNB CoMP JT can be beneficial in many scenarios. For example, inter-eNB CoMP JT can be beneficial in the case where the UE's channel can only sustain rank-1 transmission from the $1^{st}$ TP for most of the time. In this case, inter-eNB CoMP JT with a second transmission from the $2^{nd}$ TP can improve average cell edge throughput. In another example, inter-eNB CoMP JT can be beneficial in the case where the UE's channel can support rank-2 transmissions from the $1^{st}$ TP for most of the time (HetNet scenario-CoMP scenario 3 in FIG. 6). In this case, inter-eNB CoMP JT with additional Physical Downlink Shared Channel (PDSCH) transmission in non-overlapping resource blocks (such as for non-full buffer traffic) can improve the average cell throughput. For at least the above scenarios, it should be assumed that the typical UE can support only up to rank-2 reception. Furthermore, as a UE can be assigned multiple PDCCH/EPDCCHs which requires larger PDCCH/EPDCCH capacity, low to medium network loads are targeted.

Figure 7:
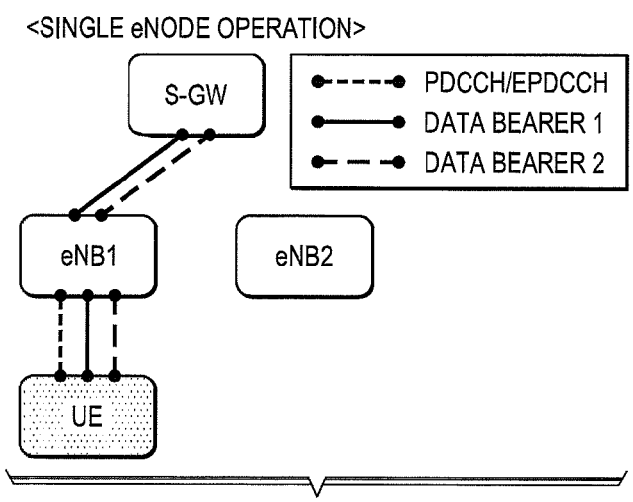
FIG. 7 illustrates an embodiment of a data path according to this disclosure.

A UE can typically be connected to one eNB in LTE. FIG. 7 illustrates this single connectivity where the data is going from the S-GW, through the eNodeB that the UE is connected to, and then on to the UE.

Figure 8A:
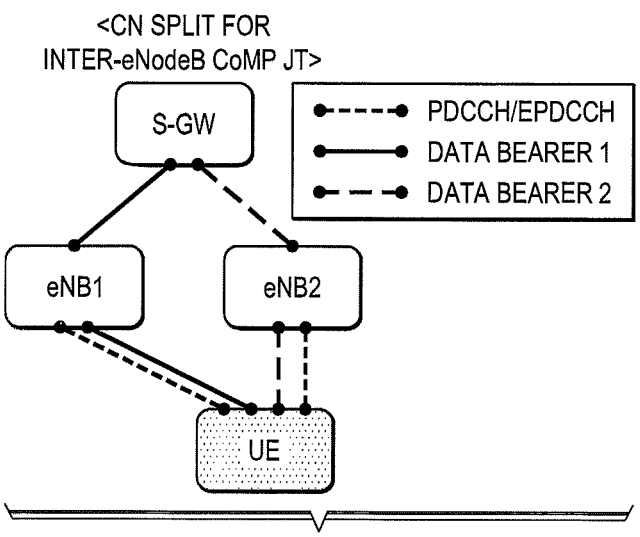
FIG. 8A illustrates an embodiment of CN split architecture according to this disclosure.
Figure 8B:
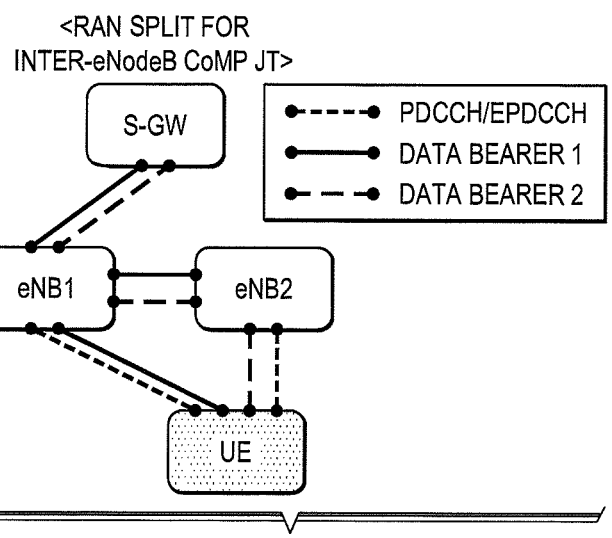
FIG. 8B illustrates an embodiment of Radio Access Network (RAN) split architecture according to this disclosure.

For inter-eNodeB CoMP JT, the UE can receive data from multiple eNodeBs. Two higher layer architectures can be implemented for inter-eNodeB CoMP JT. In an embodiment, Core Network (CN) split architecture can be implemented. FIG. 8A illustrates an embodiment of CN split architecture according to this disclosure. Specifically, FIG. 8A illustrates an embodiment of CN split architecture so that when each of the eNodeBs transmits data to the UE, the UE can receive the data directly from the S-GW. FIG. 8B illustrates an embodiment of Radio Access Network (RAN) split architecture according to this disclosure. With RAN split architecture, one eNB can receive the data for the UE directly from the S-GW and can transmit a part of the data received to the UE. Additionally with RAN split architecture, the eNB can forward other parts of the data over the X2 interface to one or more other eNBs for transmission.

Figure 9:
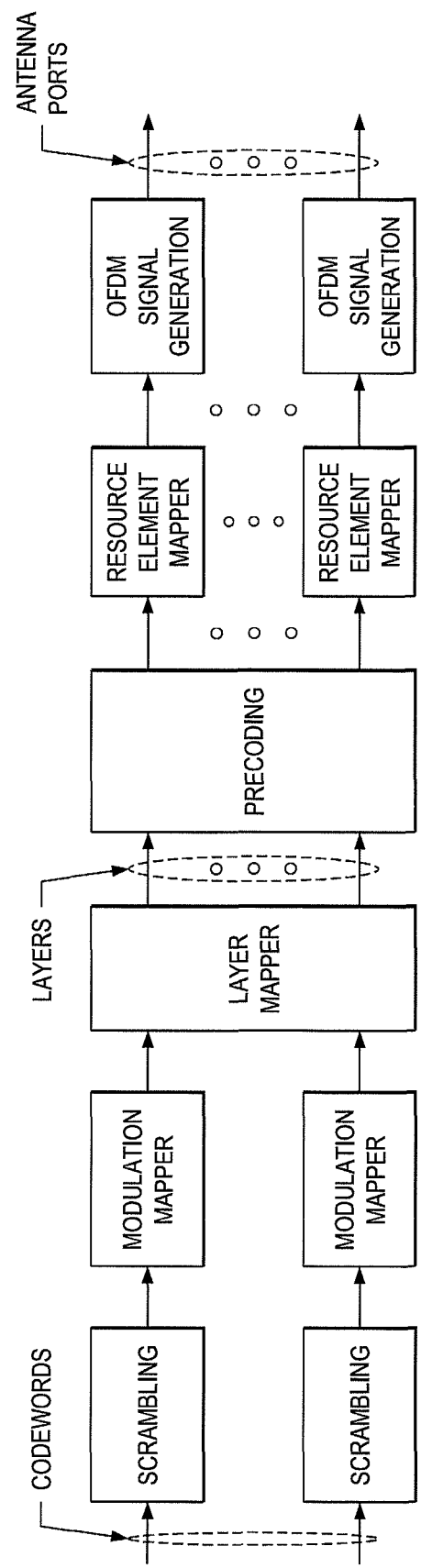
FIG. 9 illustrates an embodiment of an overview of physical channel processing according to this disclosure.

Before proceeding further, an overview of physical channel processing will be disclosed. The background information regarding the Rel-8/9/10/11 PDSCH processing can be found in 3GPP TS 36.211 V11.1.0 (2012-12) and 3GPP TS 36.212 V11.1.0 (2012-12). An embodiment of an overview of the physical channel processing is illustrated in FIG. 9 according to this disclosure as well as 3GPP TS 36.211 V11.1.0 (2012-12).

Physical channel processing involves PDSCH scrambling. With PDSCH scrambling, for each codeword q there is a block of bits $b^{(q)}(0), \ldots, b^{(q)}(M_{bit}^{(q)}-1)$, where $M_{bit}^{(q)}$ is the number of bits in codeword q transmitted on the physical channel in one subframe. The block of bits can be scrambled prior to modulation resulting in a block of scrambled bits) $\tilde{b}^{(q)}(0), \ldots, \tilde{b}^{(q)}(M_{bit}^{(q)}-1)$ according to $$\tilde{b}^{(q)}(i) = (b^{(q)}(i) + c^{(q)}(i)) \bmod 2$$

where the scrambling sequence $c^{(q)}(i)$ is given by Section 7.2 of 3GPP TS 36.211 V11.1.0 (2012-12). The scrambling sequence generator can be initialized at the start of each subframe, where the initialization value of $c_{init}$ depends on the transport channel type according to $$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH} \\ \lfloor n_s/2 \rfloor \cdot 2^9 + N_{ID}^{MBSFN} & \text{for PMCH} \end{cases}$$

where $n_{RNTI}$ corresponds to the radio network temporary identifier (RNTI) associated with the PDSCH transmission as described in Section 7.1 of 3GPP TS 36.321 V11.2.0 (2012-12). Furthermore, up to two codewords can be transmitted in one subframe (such as q∈{0,1}). Additionally, in the case of single codeword transmission q is equal to zero.

For Rel-10/11 LTE Downlink Power Allocation with transmission mode 9 or 10, if UE-specific reference signals (RSs) can be present in the physical resource blocks (PRBs) upon which the corresponding physical downlink shared channel (PDSCH) is mapped, the UE can assume the ratio of PDSCH energy per resource element (EPRE) to UE-specific RS EPRE within each OFDM symbol containing UE-specific RS is 0 dB for a number of transmission layers less than or equal to two. Otherwise, the UE can assume the ratio of PDSCH energy per resource element (EPRE) to UE-specific RS EPRE within each OFDM symbol containing UE-specific RS is −3 dB.

For at least the purposes of this disclosure, the primary CoMP eNB can be the eNB that a UE is attached to upon initial access. Furthermore, the secondary CoMP eNBs can be the one or more eNBs that are involved in the inter-eNB CoMP JT scheme apart from the primary CoMP eNB. The eNBs that participate in the inter-eNB CoMP scheme can be referred to as the CoMP eNBs and the UE that is involved in the inter-eNB CoMP scheme can be called the CoMP UE. We shall sometimes refer to a CoMP eNB as a TP.

Figure 10:
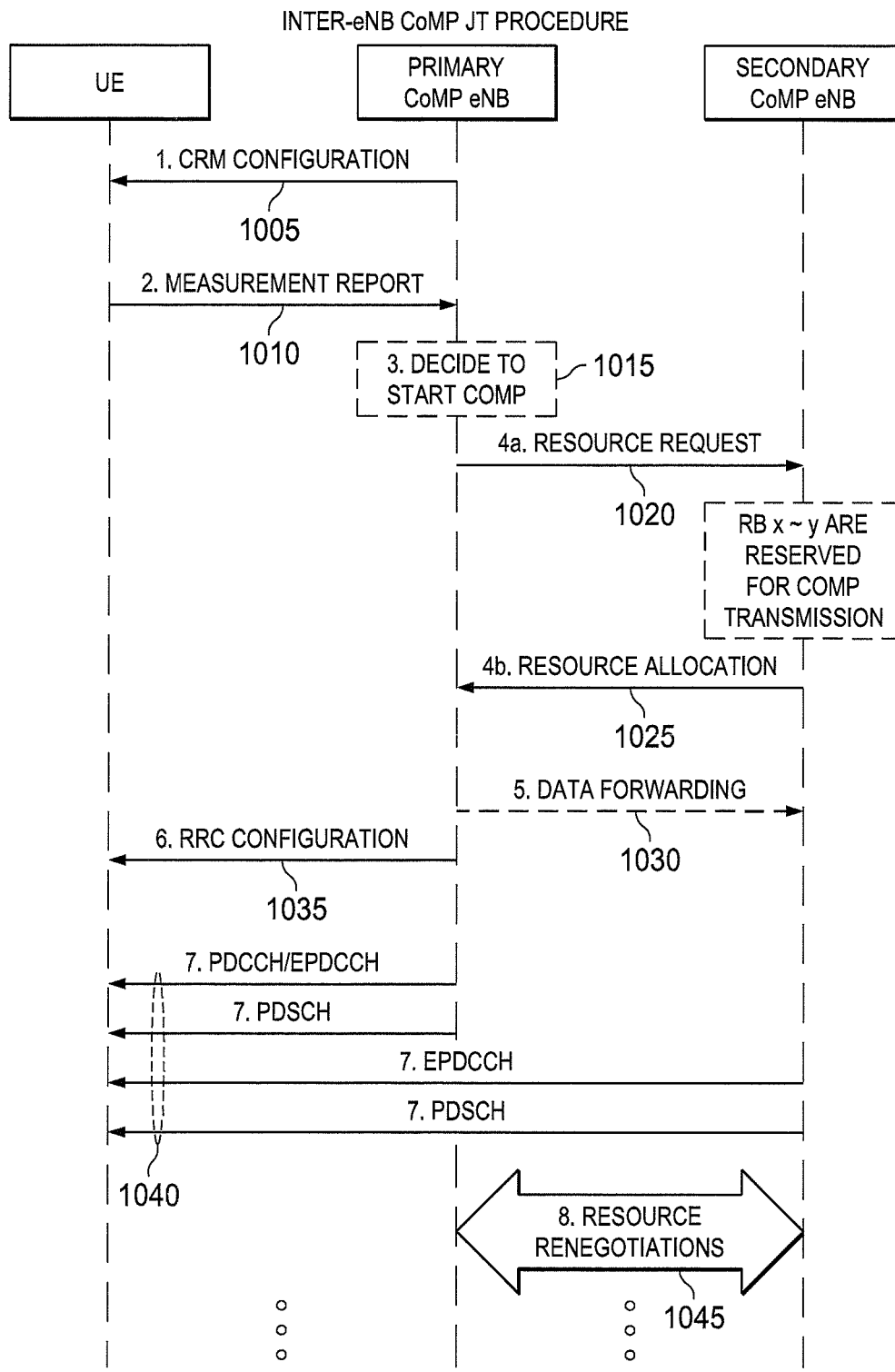
FIG. 10 illustrates an embodiment of a high level inter-eNB CoMP JT method according to this disclosure.

FIG. 10 illustrates an embodiment of a high level inter-eNB CoMP JT method according to this disclosure. Generally, the method can involve the network (such as the primary CoMP eNB) determining or identifying the set of eNBs that are suitable to or configured to participate in the inter-eNB CoMP JT. The method can also involve setting up the necessary configurations between the eNBs and configuring or reconfiguring the UEs depending on UE mobility or the change in the channel conditions.

At Step 1005, in an embodiment, the primary CoMP eNB can implement CoMP resource management (CRM) configurations. The primary CoMP eNB implements CRM configurations to determine the set of eNBs (or TPs) that are suitable to participate in inter-eNB CoMP JT. Using CRM, the primary CoMP eNB determines the set of eNBs (or TPs) that are suitable to participate in inter-eNB CoMP JT based on UE measurement reports of the signals transmitted from the eNB(s). In an embodiment, the signals to be measured by the UE for CRM can be CSI-RSs, CRS, discovery signals (such as for small cells), or the like. For convenience, we shall refer to these signals within this disclosure as CSI-RSs without limiting these signals to only CSI-RSs. Additionally, it can be assumed that the neighboring eNBs can exchange information about the respective CSI-RS resources beforehand, either over X2 transmissions or via OAM transmissions. Hence, the primary CoMP eNB can know the set of CSI-RS resources that are configured to the UE for the purposes of CRM.

At step 1010, in an embodiment, the UE can measure the CoMP resource measurement (CRM) and report the CRM measurement to the primary CoMP eNB. The method for CRM measurement and reporting by the UE can be similar to the CRM procedure disclosed in Rel-11 (see for example, Juho Lee et al, "Coordinated Multipoint Transmission and Reception in LTE-Advanced Systems", IEEE Communications Magazine, Vol. 50, Issue 11, Page(s) 44-50, November 2012.)

Furthermore, while steps 1005 and 1010 can be used by a primary CoMP eNB to determine the set of eNBs (or TPs) that are suitable to participate in inter-eNB CoMP JT, the primary CoMP eNB can also use any other means available to determine the set of eNBs (or TPs) that are suitable to participate in inter-eNB CoMP JT. For example, an alternative method to the CRM method can be for the primary CoMP eNB to rely on the measurements of UL signals such as the sounding reference signals (SRS) or other available location information such as the GPS information or the measurement from positioning reference signals as disclosed in 3GPP TS 36.355 V11.0.0 (2012-09).

At step 1015, in an embodiment, the primary CoMP eNB can decide to initiate inter-eNB CoMP JT operation. The primary CoMP eNB can decide to initiate inter-eNB CoMP JT based on the UE measurement reports. Furthermore, the primary CoMP eNB can choose the set of neighboring eNBs. In the case of Core Network (CN) split higher layer architecture, this decision can be conveyed to the core network so that eNBs selected by the primary CoMP eNB can start to receive data for the UE from the serving gateway.

In certain embodiments, inter-eNB CoMP resource negotiation between eNBs can take place. Inter-eNB CoMP resource negotiations can include allowing the eNB (such as the secondary CoMP eNBs) selected or chosen by the primary CoMP eNB to determine the allocation of the CoMP resources for each of the selected or chosen eNBs. For example, inter-eNB CoMP resource negotiation messages can be exchanged between the selected or chosen eNBs over an X2 interface. With inter-eNB CoMP resource negotiation between eNBs, the primary CoMP eNB can make resource requests to the secondary CoMP eNBs as shown in step 1020 and the secondary CoMP eNBs can make resource allocations to the primary CoMP eNB as shown in step 1025. In certain embodiments, CoMP resources can refer to one or more of the following: physical resource blocks (PRBs), subframes, DM-RS ports, virtual C-RNTI, or the like.

At step 1030, data to be scheduled and transmitted from the secondary CoMP eNBs can be forwarded from the primary CoMP eNB to the one or more secondary CoMP eNBs. Data forwarding at least in this manner can be particularly relevant for the RAN split higher layer architecture.

At step 1035, radio resource control (RRC) configuration can take place for inter-eNB CoMP. In certain embodiments, RRC configuration for inter-eNB CoMP can comprise channel state information-reference signal (CSI-RS) resource configuration for inter-eNB CoMP. There are several methods of configuring the CSI-RS resource for inter-eNB CoMP. For example, each TP can typically be associated with a CSI-RS resource configuration. Assuming "N" TPs are involved in inter-eNB CoMP transmission, "N" CSI-RS resources can be configured to the UE. The CSI feedback mode and other CSI measurement assumptions for each CSI-RS resource can be configured separately for each TP. The UE can measure the "N" configured CSI-RS resources and feedback CSI to each eNB. Generally, the methods of CSI delivery to the eNBs are out of the scope of this DOI. However, at least for this disclosure, it is sufficient to assume that each eNB involved in inter-eNB CoMP can receive the CSI corresponding to the DL channel between the eNB and the UE.

In certain embodiments, RRC configuration for inter-eNB CoMP can comprise quasi co-location (QCL) configuration for inter-eNB CoMP. As described in section 7.1.10 of 3GPP TS 36.213 V11.1.0 (2012-12), Rel-11 QLC behavior B is typically applicable for inter-eNB CoMP, although it is possible for certain deployment scenario for the network to assume QCL behavior A also described in 7.1.10 of 3GPP TS 36.213 V11.1.0 (2012-12).

In certain embodiments, RRC configuration for inter-eNB CoMP can comprise PDSCH rate matching configuration for inter-eNB CoMP. Similar to Rel-11 CoMP, the cell-specific reference signal (CRS) rate matching pattern, multimedia broadcast multicast service single frequency network (MBSFN) subframe configuration, PDSCH starting symbol, and zero power (ZP) CSI-RS for each PDSCH can be different.

At step 1040, in certain embodiments, the primary CoMP eNB and one or more secondary CoMP eNBs can perform scheduling and can carry out transmissions using pre-negotiated resources. For example, the primary CoMP eNB can carry out transmissions through PDCCH/EPDCCH or PDSCH and one or more second CoMP eNBs can carry out transmissions through EPDCCH or PDSCH. Step 1040 will be discussed further herein at least with respect to independent downlink (DL) assignment for each eNB.

At step 1045, in certain embodiments, additional resource negotiations or renegotiations between CoMP eNBs (such as between a primary CoMP eNB and secondary CoMP eNBs or between secondary CoMP eNBs) can occur. The additional resource negotiations or renegotiations can occur because of, for example, UE mobility or channel condition changes. Furthermore, in certain embodiments, the inter-eNB CoMP operation can terminate.

As previously disclosed, the primary CoMP eNB and one or more secondary CoMP eNBs can perform scheduling and can carry out transmissions using pre-negotiated resources. This step can be executed with independent DL assignments from each eNB. For an understanding of a framework for independent DL assignments from each eNB, assume there are N TPs configured to perform inter-eNB CoMP JT for a UE, where N=2,3,4, . . . . In certain embodiments, each of the N TPs can transmit a single Transport Block (TB) to the UE on the same carrier. In this case, each transport block can be carried by a PDSCH. In certain embodiments, each of the N TPs can transmit up to two TBs to the UE on the same carrier. For example, one or two TBs can be carried by a PDSCH.

An advantage of independent DL assignments for each eNB where each of the N TPs can transmit a single TB to the UE on the same carrier can be that the number of TBs to be received by the UE per carrier can be reduced. Furthermore, an advantage of independent DL assignments for each eNB where each of the N TPs can transmit up to two TBs to the UE on the same carrier can be that 3GPP LTE methods (such as a 3GPP LTE Rel-8 method) can be reused for each TP. However, with at least some 3GPP LTE methods the total number of TBs that need to be processed by the UE can be more than 2 per carrier frequency.

Regardless, for independent DL assignments for each eNB where each of the N TPs can transmit a single TB to the UE on the same carrier and where each of the N TPs can transmit up to two TBs to the UE on the same carrier, each TP can perform independent scheduling of PDSCH. As a result, each of the N TPs can independently construct Dynamic Control Information (DCI) containing the scheduling information for the PDSCH carrying its transport block. Up to N DCIs can be carried by the corresponding number of PDCCHs/EPDCCHs. The UE configured with inter-eNB CoMP JT can be required to monitor up to N PDCCHs/EPDCCHs for DL assignments in a subframe of a carrier simultaneously. In addition, the HARQ processes for the DL assignments can also be independent.

UE behavior to facilitate inter-eNB CoMP JT operation can be initiated or terminated by higher layer signaling from the network, e.g. using RRC signaling. For example, in an embodiment, inter-eNB CoMP JT can be initiated by the configuration of a new transmission mode (such as a future transmission mode 11). Similarly, the inter-eNB CoMP JT operation can be terminated when the transmission mode configured to the UE is no longer the new transmission mode. In certain embodiments, the UE can recognize the configuration of inter-eNB CoMP JT operation through the configuration of multiple transmission modes simultaneously for a particular carrier. In other words, if the UE is configured with more than one transmission mode for a carrier, then the UE has been configured with inter-eNB CoMP JT. Conversely, if the UE is not configured with more than one transmission mode for a carrier, then the UE has not been configured with inter-eNB CoMP JT.

It should be understood that the number of transmission modes implies the number of TPs involved in the inter-eNB CoMP JT operation and hence the maximum number of the DL assignments that can be expected by the UE. The total number of TPs, N, that participate in inter-eNB CoMP JT can be capped in order to limit the impact on UE complexity. In an embodiment, the number N can be a predetermined number in a specification (such as 2 or 3). In certain embodiments, if the total number of transport blocks that can be handled by the UE in a subframe is 2 as in 3 GPP LTE Rel-8 to 11, then N=2. In certain embodiments, N can also be dependent on the capability of the UE (such as that a certain UE can be capable of handling N=2 while a different UE can be capable of handling N=3). Thus, the number N that can be handled by the UE can be signaled as a part of the UE capability signaling to the network.

In certain embodiments, multiple cell RNTIs (C-RNTIs) can be configured for inter-eNB CoMP. In general, the same C-RNTI cannot be used by two UEs that are RRC-connected to the same cell simultaneously. If the secondary CoMP eNodeB is a stand-alone eNodeB, (such that it is capable of operating as a stand-alone cell handling its own UEs) the C-RNTI assigned by the primary CoMP eNodeB for a CoMP UE can happen to also be used by the secondary CoMP eNodeB for another UE. If the secondary CoMP eNodeB also uses the C-RNTI used by the primary CoMP eNodeB to serve the CoMP UE, then the same C-RNTI could be used by two or more UEs in the same carrier. However, when the same C-RNTI is used by two or more UEs in the same carrier, a C-RNTI collision problem can occur.

To avoid the C-RNTI collision problem, the UE can be configured with a different C-RNTI for different TPs. Thus, upon configuration of C-RNTI for a TP, the UE can use the C-RNTI to determine the UE-specific search space for PDCCH/EPDCCH. For example, the UE can use the C-RNTI to determine the UE-specific search space for PDCCH/EPDCCH by scrambling the cyclic redundancy check CRC of the PDCCH/EPDCCH and the PDSCH for the TP.

If the C-RNTI for a secondary CoMP eNB is configured by the primary CoMP eNB (for example, as part of the RRC message to set up inter-eNB CoMP), then the primary CoMP eNB can determine the C-RNTI of choice of the secondary CoMP eNB and configure the C-RNTI associated with the UE. In certain embodiments, during the process of setting up inter-eNB CoMP, the secondary CoMP eNB can be required to select a C-RNTI and forward the selected C-RNTI (such as over an X2 interface) to the primary CoMP eNB. This can allow the primary CoMP eNB to include the new C-RNTI in the inter-eNodeB CoMP higher layer configuration message to the CoMP UE.

In certain embodiments, during the process of setting up inter-eNB CoMP, the primary CoMP eNB can be required to forward the C-RNTI value (such as over an X2 interface) that the primary CoMP eNB uses for the CoMP UE to the one or more secondary CoMP eNBs. Upon receiving the C-RNTI from the primary CoMP eNB, the secondary CoMP eNB can check or verify if the C-RNTI has already been used for one of the UEs served by the secondary CoMP eNB. If the forwarded C-RNTI has already been used, the secondary CoMP eNB can choose a new C-RNTI for the CoMP UE. The secondary CoMP eNB can then forward the new C-RNTI to the primary CoMP eNB (such as over an X2 interface) so that the primary CoMP eNB can include the new C-RNTI in the inter-eNB CoMP higher layer configuration message to the CoMP UE. Conversely, if the forwarded C-RNTI is not already used by the secondary CoMP eNB, the secondary CoMP eNB can merely acknowledge the reception of the forwarded C-RNTI to the primary CoMP eNB (such as over an X2 interface). The primary CoMP eNB, upon receiving the acknowledgement, can then assume that the earlier forwarded C-RNTI will also be used by the secondary CoMP eNodeB.

It should be noted that the inter-eNodeB CoMP configuration message to the UE contains the C-RNTI value that the UE shall assume for the secondary CoMP eNB. Generally, because a large number of RNTIs are reserved for C-RNTI, a collision of C-RNTIs can be rare. Thus, signaling of C-RNTI value for secondary CoMP eNB to the UE may not always be present. If the signaling of the C-RNTI is absent, the CoMP UE can assume the same C-RNTI for the secondary CoMP eNodeB as for the primary CoMP eNodeB.

With either the embodiment where a C-RNTI is selected by a secondary CoMP eNB or the embodiment where the C-RNTI value used for the CoMP UE is forwarded by a primary CoMP eNB to a secondary CoMP eNB, there is a possibility that the chosen C-RNTI by the secondary CoMP eNB can be the same as C-RNTI used for the primary CoMP eNB. Because of this possibility, additional coordination between the eNBs can be used to partition the C-RNTI set into non-overlapping subsets so that each subset can be assigned to one of the eNBs participating in inter-eNB CoMP. The additional coordination can ensure that the C-RNTI used for different TPs are different.

In certain embodiments, for inter-eNB CoMP JT, physical resource blocks (PRBs) can be allocated for example so that the PRBs allocations for the PDSCHs are non-overlapping PRBs. In at least some cases, PRBs for PDSCH allocated by TPs may not be allowed to be overlapping in time or frequency. Thus, coordination between eNBs on the frequency resource partition or the time resources partition can be required to ensure that the PRBs for PDSCH do not overlap in time or frequency.

Furthermore, the primary CoMP eNB can be given the authority to determine its preferred time resources or preferred frequency resources for the UE. In this case, the primary CoMP eNB can send messages to the one or more secondary CoMP eNBs (such as over an X2 interface) informing the one or more secondary CoMP eNBs of the time-frequency resources that the one or more secondary CoMP eNBs should avoid using with the UE or, equivalently, the time-frequency resources that the one or more secondary CoMP eNBs should use with the UE (such as the CoMP UE).

For example, assuming there are 50 PRBs labeled PRB#1 through PRB#50, the primary CoMP eNB can provide a message to a secondary CoMP eNB indicating, for example, that PRB#1 through PRB#10 should be avoided by the secondary CoMP eNB for the purpose of scheduling to the CoMP UE. However, the same message from the primary CoMP eNB to the secondary CoMP eNB can be limited to an indication that PRB#1 through PRB#10 should be avoided by the secondary CoMP eNB for the purpose of scheduling to the CoMP UE so that the secondary CoMP eNB can utilize PRB#1 through PRB#10 for the other UEs that the secondary CoMP eNB is serving at the same time. This indication limitation of the message from the primary CoMP eNB to a secondary CoMP eNB can allow for the reuse of PRBs by the secondary CoMP eNB to other UEs without generating excessive and unwanted interference to the CoMP UE, for example when the other UEs are far away from the CoMP UE. It should be understood that a message indicating a limitation of particular set of PRBs can be for all subframes or for only a subset of all of the subframes.

As previously discussed, N TPs can be configured to perform inter-eNB CoMP JT for a UE. In the case where N=2, there is only one secondary CoMP eNB. In this case, the single secondary CoMP eNB needs only to take into account the decision of the primary CoMP eNB. However, in the case where N>2, two or more secondary CoMP eNBs are present. In this case, the eNB with the higher average received signal power can get the priority to indicate its preferred time frequency resources over another eNB with a relatively lower average received signal power. Hence, the eNB n (n=1, ..., N) can be denoted as the eNB with the n-th priority (n-th highest average received signal power), and thus eNB n needs to take into account the decisions of eNB 1 to eNB n−1.

The priority order of the eNBs can be determined based on the reference signal received power (RSRP)/channel state information (CSI)–RSRP measured by the UE of the eNBs. It should be understood that other signal measurement metrics that also reflect the average received signal strength or channel quality can be used in addition to or as an alternative to RSRP/CSI-RSRP. Furthermore, the RSRP/CSI-RSRP reports can be sent to the primary CoMP eNB or the one or more secondary CoMP eNBs. In this case where the RSRP/CSI-RSRP measurement reports are only sent to the primary CoMP eNB, then the primary CoMP eNB can inform the other secondary CoMP eNBs of the priority order. Additionally, in the case where the RSRP/CSI-RSRP measurement reports are sent to all eNBs, then each eNB can determine its own priority from the reports.

It should be understood that since the resources are coordinated to be non-overlapping in time and frequency, demodulation-reference signal (DM-RS) port coordination may not be required. Thus, each CoMP eNB can be free to assign the DM-RS ports for the CoMP UE.

Figure 11:
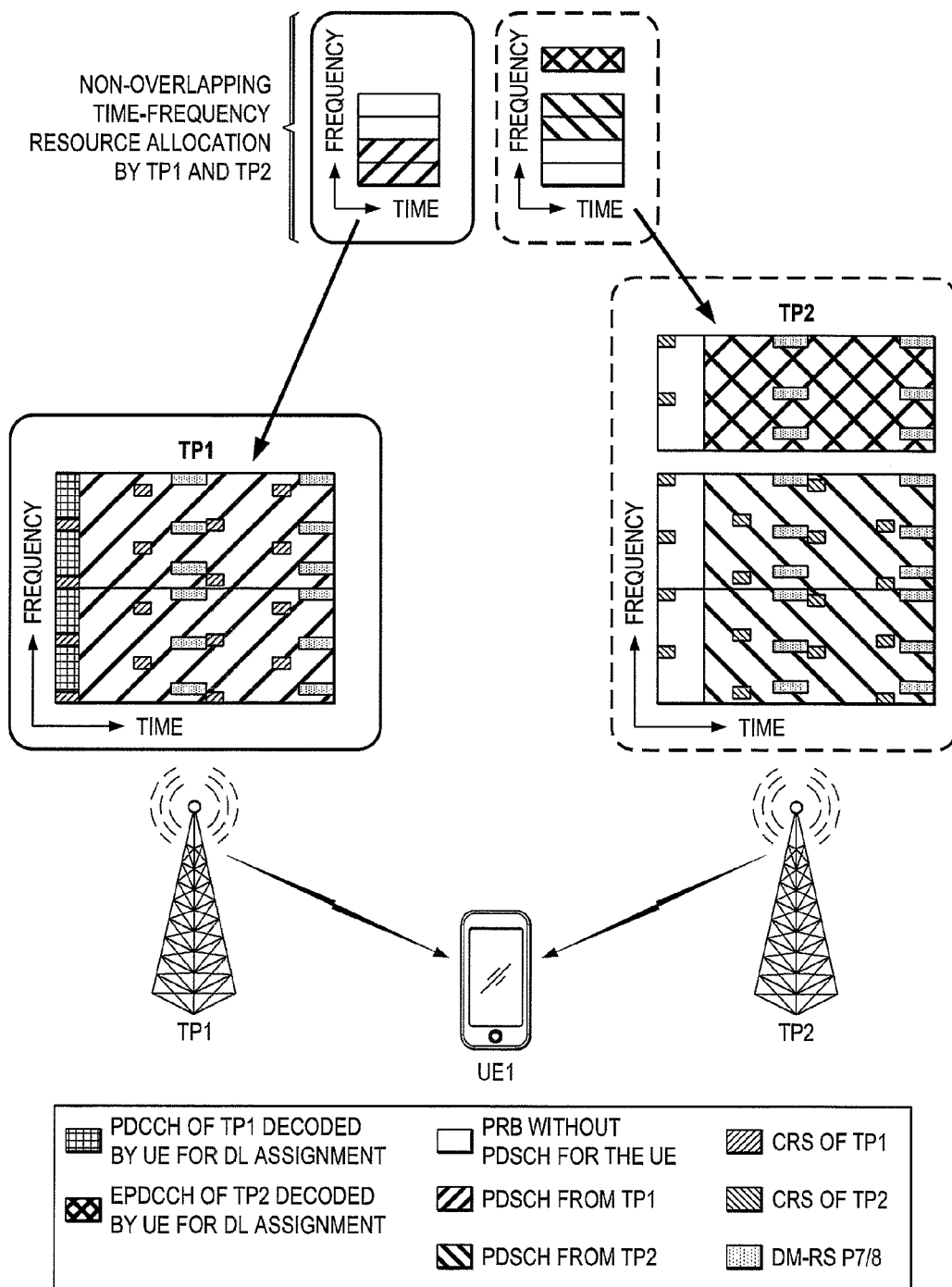
FIG. 11 illustrates an embodiment of non-overlapping PRB allocations for PDSCH according to this disclosure.

PRB allocation can be beneficial in the case where the primary CoMP eNB is able to transmit with high rank most of the time. Furthermore, additional allocation of non-overlapping resources from the secondary CoMP eNBs can also increase the UE throughput. FIG. 11 illustrates an embodiment of non-overlapping PRB allocations for PDSCH according to this disclosure.

Figure 12:
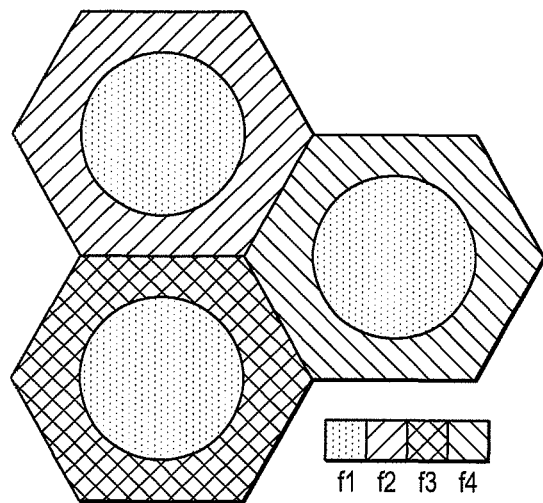
FIG. 12 illustrates an embodiment of frequency-domain-based ICIC resource allocation according to this disclosure.

As previously discussed, time/frequency partitions can be utilized between CoMP eNBs. In certain embodiments, CoMP eNBs can utilize frequency-domain-based resource partitioning. Frequency-domain-based resource partitioning methods (such as those defined for LTE Rel. 8/9), also known as Inter-Cell Interference Coordination (ICIC), define mechanisms in which a cell's PRBs are partitioned into, for example, two sets. For example, a first set of PRBs can be reused in all neighboring cells and can be typically scheduled to UEs close to the eNB because they are typically much less affected by inter-cell interference than UEs at the edge of the cell. Additionally, a second set of PRBs cannot be reused in every cell, but can have a reuse factor of R>1. These PRBs can be typically reserved for cell-edge UEs who benefit from increased signal to inference plus noise ratio (SINR) due to the reduced inter-cell interference. FIG. 12 illustrates an embodiment of frequency-domain-based ICIC resource allocation according to this disclosure. Specifically, FIG. 12 illustrates an ICIC partition with R=3 for the cell-edge.

Thus, in certain embodiments, the PRB partitions between the CoMP eNBs can be defined by a relative narrowband transmit power (RNTP) indicator which can be exchanged over the X2 interface between neighboring eNBs. The RNTP indicator can be a bitmap with each bit corresponding to a RB and can indicate whether or not the cell is planning to keep the RB's transmit power below an upper limit. Upon receiving the RNTP, a CoMP eNB may not schedule data for the target UEs in the RBs indicated to be used by the other CoMP eNB.

The value of the transmit power upper limit and the period by which the indicator is valid can be configurable and can be set by the primary CoMP eNB based upon the related inter-eNB CoMP JT parameters related to expected transmit powers for the TPs and the estimated duration of the inter-eNB CoMP configuration.

Figure 13:
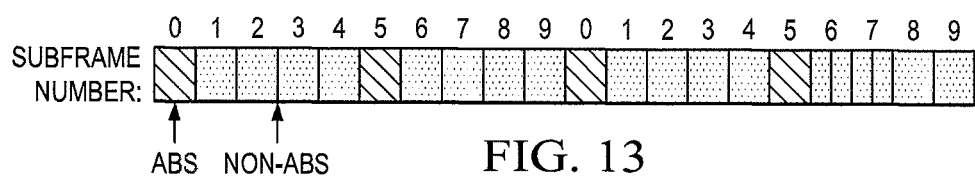
FIG. 13 illustrates an embodiment of time-domain-based eICIC resource allocation according to this disclosure.

In certain embodiments, in addition to or as an alternative to CoMP eNBs utilizing frequency-domain-based resource partitioning, CoMP eNBs can utilize time-domain-based resource partitioning. Time-domain partitions between the CoMP eNBs (such as LTE Rel-10 time-domain-based resource partitioning) also known as enhanced ICIC (eICIC) can partition subframes into two sets. For example, a first set of subframes can be used by all cells, while a second set of subframes can be reserved for data transmissions from only certain cells (such as small cells). These reserved subframes can be termed Almost Blank Subframes (ABSs) due to the fact that the cells which do not schedule data transmissions on an ABS are typically macrocells and may still transmit certain control channels and reference signals to ensure backwards compatibility with UEs (such as with Rel 8/9 UEs). The small cells can utilize the ABSs to schedule UEs with low SINR (typically at the cell-edge) to improve their throughput since the macro-cell interference is largely removed. The periodicities of the ABS patterns can be designed to align with the synchronous uplink HARQ operation. For example, for an FDD network, the periodicity is a multiple of 40 ms. FIG. 13 illustrates an embodiment of time-domain-based eICIC resource allocation according to this disclosure. Specifically, FIG. 13 illustrates an eICIC ABS pattern with 2 ABSs for every frame.

The ABS configurations can be exchanged between eNBs via the X2 interface using an ABS Pattern message. Similar to the frequency domain ICIC approach, the ABS Pattern can be a bitmap which indicates whether or not a cell is planning to keep the transmit power below an upper limit. However, unlike with the frequency domain ICIC approach, the ABS Pattern bitmap can make an indication as whether or not a cell is planning to keep transmit power below an upper limit on a subframe-by-subframe basis. Thus, upon receiving the ABS Pattern, a CoMP eNB can restrict scheduling data for the target UEs to the subframes indicated by another CoMP eNB to be non-ABS subframes or ABS subframes, respectively, depending on whether the sending or receiving CoMP eNB can transmit on the ABS subframes.

The value of the transmit power upper limit and the periodicity of the ABS patterns can be configurable and can be set by the primary CoMP eNB based upon the related inter-eNB CoMP JT parameters related to expected transmit powers for the TPs and the estimated duration of the inter-eNB CoMP configuration.

In certain embodiments, for inter-eNB CoMP JT, physical resource blocks (PRBs) can be allocated for example so that the PRBs allocations for the PDSCHs are independent PRB allocations. In at least some cases, PRBs for PDSCHs allocated by the TPs can be independently allocated and can be allowed to overlap in time and frequency (such as with spatial multiplexing). The overlap can be partial, which relaxes the scheduling restriction in terms of time/frequency resources of each TP. To ensure sufficient channel estimation quality, DM-RS ports used by each TP for the overlapping resource blocks for PDSCH may not have the same port index (such that the DM-RS ports for two different TPs are orthogonal). In certain embodiments, under independent PRB allocation, DM-RS port assignments for PDSCH can be coordinated beforehand among the CoMP eNBs. Thus, independent PRB allocation can be beneficial when, for example, the primary CoMP eNB is only able to transmit with low rank (such as a lower rank than what the UE is capable of receiving) most of the time due to poor channel conditions. Furthermore, with the additional allocation of overlapping resources from the secondary CoMP eNBs, the UE throughput can be increased.

To provide some examples of DM-RS port assignment coordination for PDSCH, it can be assumed that N=2 (such as the number of TPs equals 2). In a first example, DM-RS Port 7 (P7) can be allocated for a first eNB (such as eNB1) while DM-RS Port 8 (P8) can be allocated for a second eNB (such as eNB2). In this example, only one transmission layer can be transmitted from each TP. Thus, the maximum number of transmission layers per PRB is 2. Furthermore, the DM-RS overhead that may be assumed by the UE for every PRB-pair assigned can be 12 resource elements (REs). Additionally, the PDSCH energy per resource element (EPRE) to DM-RS EPRE ratio can be assumed by the UE to be always 0 dB. The DM-RS port can be indicated in the DCI, (similar to that used for DCI format 2B to be discussed further herein). Each DCI indicates that one of the transport blocks can be disabled and the new data indicator (NDI) indicates the DM-RS port as shown below in Table 4.

TABLE 4

Antenna port for single-antenna port transmission (one transport block disabled).

| New data indicator of the disabled transport block | Antenna port |
|---|---|
| 0 | 7 |
| 1 | 8 |

Instead of reusing DCI format 2B, a new DCI format (which can be referred to as DCI format 2B') can be modified such that the modulation and coding scheme (MCS), NDI and RV information bits (for a total of 8 bits) for the second transport block can be replaced with one bit to indicate the DM-RS port as illustrated below in Table 5.

TABLE 5

Antenna port for single-antenna port transmission.

| New DCI bits (DM-RS port and the number of layers) | Antenna port |
|---|---|
| 0 | 7 |
| 1 | 8 |

The DM-RS port to receive the PDSCH for a TP can also be semi-statically signaled to the UE. For example, higher layer configuration can indicate to the UE that the PDSCH scheduled from an EPDCCH in a EPDCCH set shall always use DM-RS P8. This may be because the specific EPDCCH and the corresponding PDSCH can always be transmitted from a secondary CoMP eNB that has been assigned DM-RS P8. In another example, the DM-RS port to receive the PDSCH for a TP can be a higher layer configured to be associated with a CSI-RS resource. Through the indication of the quasi co-located CSI-RS, the DM-RS port to receive the PDSCH can be the DM-RS port associated with the indicated quasi co-located CSI-RS.

Figure 14:
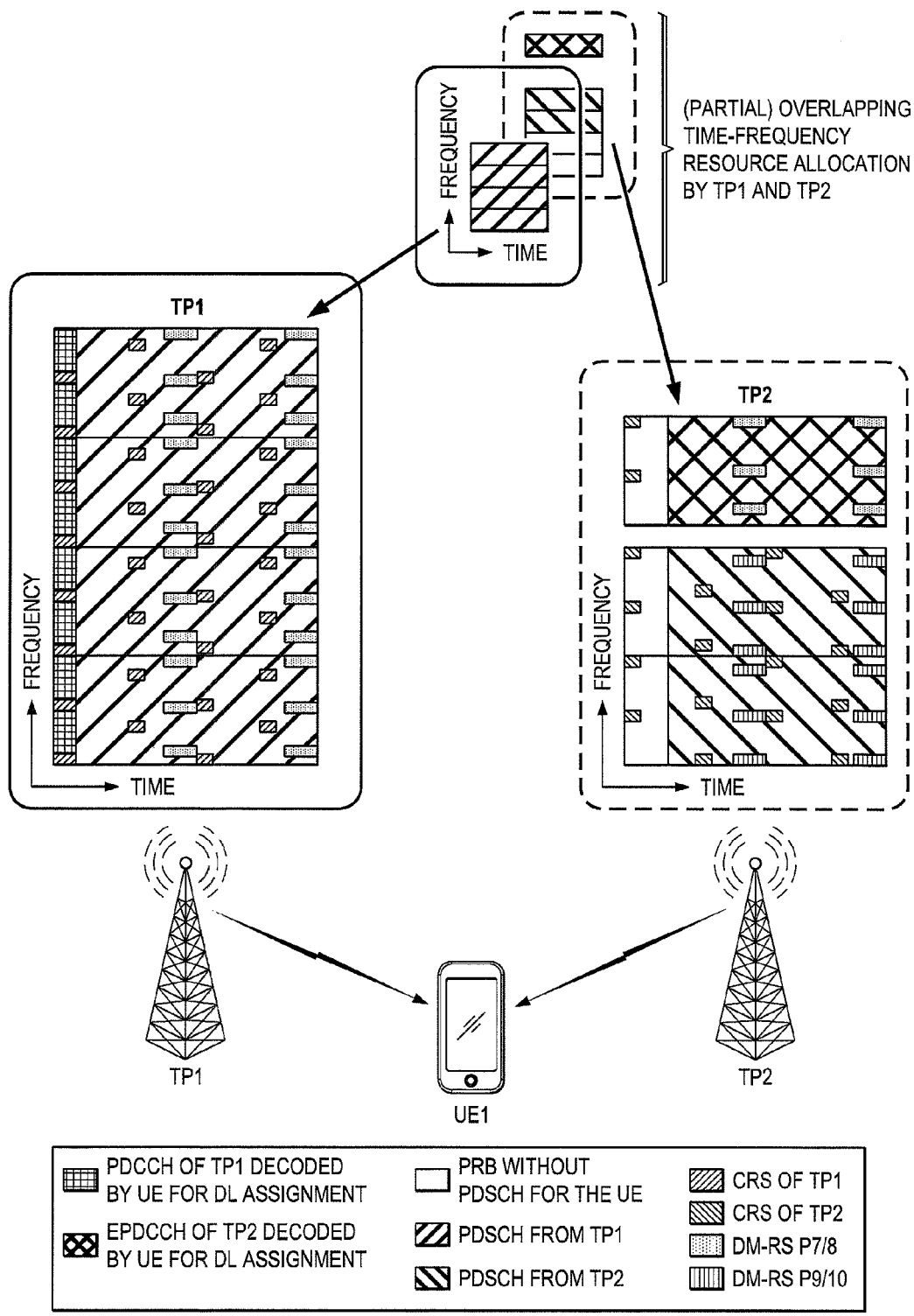
FIG. 14 illustrates an embodiment of at least partially overlapping PRB allocations for PDSCH according to this disclosure.

FIG. 14 illustrates an embodiment of at least partially overlapping PRB allocations for PDSCH according to this disclosure. In this example, DM-RS P7/8 can be allocated for a first eNB (such as eNB1) while DM-RS P9/10 can be allocated for a second eNB (such as eNB2). In this example, the maximum number of transmission layers transmitted from each TP, can be 1, 2, or 4 and can be different for different TPs. The DM-RS overhead that may be assumed by the UE for every PRB-pair assigned can be 24 REs. The PDSCH EPRE to DM-RS EPRE ratio can be assumed by the UE to always be −3 dB. Furthermore, the DM-RS port can be indicated in a DCI (such as a DCI format X). Thus, depending on the source of the DCI (whether eNB1 or eNB2), the DCI bits for the one or more antenna ports, scrambling identity, and the number of layers indicated can be interpreted differently. Table 6 below illustrates how the DCI bits for the one or more antenna ports, scrambling identity, and the number of layers indicated can be interpreted for eNB1 (such as the primary CoMP eNB) while Table 7 below illustrates how the DCI bits for the one or more antenna ports, scrambling identity, and the number of layers indicated can be interpreted for eNB2 (such as a secondary CoMP eNB). The principle behind Table 6 and Table 7 can be to map the DM-RS ports for an eNB to the same code division multiplexing (CDM) group.

TABLE 6

Antenna port(s), scrambling identity and number of layers
indication for eNB1 (e.g. the primary CoMP eNB)

| Value | Message (Alt 1) | Message (Alt 2) |
|---|---|---|
| 0 | 1 layer, port 7, $n_{SCID} = 0$ | 1 layer, port 7, $n_{SCID} = 0$ |
| 1 | 1 layer, port 7, $n_{SCID} = 1$ | 1 layer, port 7, $n_{SCID} = 1$ |
| 2 | 1 layer, port 8, $n_{SCID} = 0$ | 1 layer, port 8, $n_{SCID} = 0$ |
| 3 | 1 layer, port 8, $n_{SCID} = 1$ | 1 layer, port 8, $n_{SCID} = 1$ |
| 4 | 2 layers, ports 7-8 | 2 layers, ports 7-8, $n_{SCID} = 0$ |
| 5 | 3 layers, ports 7-8, 11 | 2 layers, ports 7-8, $n_{SCID} = 1$ |
| 6 | 4 layers, ports 7-8, 11, 13 | 3 layers, ports 7-8, 11 |
| 7 | Reserved | 4 layers, ports 7-8, 11, 13 |

TABLE 7

Antenna port(s), scrambling identity and number of layers
indication for eNB2 (e.g. a secondary CoMP eNB)

| Value | Message (Alt 1) | Message (Alt 2) |
|---|---|---|
| 0 | 1 layer, port 9, $n_{SCID} = 0$ | 1 layer, port 9, $n_{SCID} = 0$ |
| 1 | 1 layer, port 9, $n_{SCID} = 1$ | 1 layer, port 9, $n_{SCID} = 1$ |
| 2 | 1 layer, port 10, $n_{SCID} = 0$ | 1 layer, port 10, $n_{SCID} = 0$ |
| 3 | 1 layer, port 10, $n_{SCID} = 1$ | 1 layer, port 10, $n_{SCID} = 1$ |
| 4 | 2 layers, ports 9-10 | 2 layers, ports 9-10, $n_{SCID} = 0$ |
| 5 | 3 layers, ports 9-10, 12 | 2 layers, ports 9-10, $n_{SCID} = 1$ |
| 6 | 4 layers, ports 9-10, 12, 14 | 3 layers, ports 9-10, 12 |
| 7 | Reserved | 4 layers, ports 9-10, 12, 14 |

For Tables 6 and 7 shown above, two signaling embodiments can be considered. For both embodiments as well as for even higher-ranks (such as rank>2), all the DM-RS can be transmitted within one CDM set of 12 REs. This can ensure that the two eNB's DM-RSs are orthogonally transmitted in separate CDM sets. In a first embodiment, with rank 2 transmission, nSCID can be fixed to 0 allowing for improved reliability for rank-2 reception. However, in a second embodiment, the nSCID can be configured to be either 0 or 1, even for rank 2 transmission, allowing for improved flexibility with MU-MIMO scheduling.

Whether Table 6 or Table 7 is applicable can depend on where the scheduling DCI is detected or the type of physical downlink control channel. For example, in a first embodiment, if the scheduling DCI is detected in PDCCH, then the UE can assume that Table 6 is applicable. Otherwise, if the scheduling DCI is detected in EPDCCH, then the UE can assume that Table 7 is applicable. In a second embodiment, if the scheduling DCI is detected in a first EPDCCH set, then the UE can assume that Table 6 is applicable. Otherwise, if the scheduling DCI is detected in a second EPDCCH set, then the UE can assume that Table 7 is applicable. In at least the second embodiment, two eNBs can independently schedule their PDSCHs by relying on their respective EPDCCH sets. For example, a first of the two eNBs can utilize the first ePDCCH set while the second of the two eNBs can utilize the second ePDCCH set. In a third embodiment, the set of DM-RS ports (or determining whether to assume Table 6 or Table 7) to receive the PDSCH for a TP can be a higher layer configured to be associated with a CSI-RS resource. Through the indication of a quasi co-located CSI-RS, the set of DM-RS ports to receive the PDSCH can be the DM-RS port associated with the indicated quasi-co-located CSI-RS.

With regards to at least DM-RS RE overhead and the PDSCH-EPRE-to-DM-RS-EPRE ratio, it can be assumed that each of the CoMP eNB are not able to keep track of the other CoMP eNBs scheduling decisions. Thus, it can be beneficial for each CoMP eNB to always assume that the DM-RS ports assigned to the other CoMP eNBs can be occupied for DM-RS transmissions and therefore avoid mapping its PDSCH data onto those REs. This can mean that when the UEs receive the PDSCH, the UEs can assume that no PDSCH can be mapped to all possible DM-RS locations.

Furthermore, it is important for the UE to make the correct assumptions for PDSCH rate matching and for the PDSCH-EPRE-to-DM-RS-EPRE ratio because, for example, if DM-RS P7-10 are assigned by the CoMP eNBs, then the total DM-RS RE overhead for PDSCH can be assumed by the UE to be 24 REs. Additionally, the UE can also assume that the PDSCH shall be rate matched around these 24 REs for DM-RS, regardless of the actual PDSCH DM-RS port(s) assigned for the particular PRBs. The PDSCH-EPRE-to-DM-RS-EPRE ratio (hereinafter the "power ratio") can be assumed by the UE to be −3 dB, regardless of the actual number of transmission layers or rank assigned to the particular PRBs.

Through coordination among the CoMP eNBs, the eNBs can determine beforehand which DM-RS ports can be assigned by a particular CoMP eNB in a subframe. Therefore, higher layer signaling (such as by the primary CoMP eNB) can be provisioned to inform the UE of the appropriate assumptions concerning the PDSCH DM-RS overhead and the power ratio. For example, higher layer signaling (such as RRC signaling) can indicate either 12 or 24 REs as the PDSCH DM-RS overhead assumption and either 0 or −3 dB as the power ratio assumption. The signaling for the DM-RS RE overhead and the power ratio can be done jointly, such that a single signaled value can jointly indicate both a DM-RS RE overhead and a power ratio. Typically, a DM-RS RE overhead of 12 RE and 24 RE, can be associated with a power ratio of 0 dB and −3 dB, respectively.

Exchanging of time/frequency partitions can be used to aid the CoMP eNBs in aligning their transmissions. For example, if two CoMP eNBs are sending one spatial layer each to the target UE, it may be beneficial for the same downlink resources to be scheduled by both eNBs. Unlike, intra-eNB CoMP where tight scheduling coordination between the TPs can be assumed, in the case of inter-eNB CoMP, extensive scheduling coordination may not be feasible due to rate and latency limitations of the backhaul. Thus, a sufficient level of coordination can be obtained by utilizing the exchanged frequency or time resource partitioning indicators as previously described under non-overlapping PRB allocation. However, with at least this embodiment, the CoMP eNBs can align the resources scheduled by the CoMP eNBs for the target UE with the RBs or subframes that are indicated for utilization by their neighbor eNBs. While this approach can create an implicit level of coordination, the schedulers can remain independent and thus do not require actual knowledge of the resource allocations of their neighbor eNBs.

In certain embodiments, obtaining an alignment of transmissions can include sending ICIC or eICIC indicators included with an inter-eNB CoMP coordination message to the CoMP eNBs. The ICIC or eICIC indicators can also indicate a target UE or set of target UEs for which the time or frequency information is relevant. In certain embodiments, the CoMP eNBs can implement the ICIC or eICIC partitioning for all the UEs. Conversely, in certain embodiments, the CoMP eNB can implement the ICIC or eICIC partitioning for only those UEs which are being served by the inter-eNB CoMP operation.

For example, a first CoMP eNB (such as CoMP eNB1) can indicate to a second CoMP eNB (such as CoMP eNB2)

via a RNTP that RB1 through RB20 will be utilized for the next few subframes in its scheduling of a first UE (such as UE1) which is being served by an inter-eNB CoMP operation from CoMP eNB1 and CoMP eNB2. In response, CoMP eNB2 can choose to schedule the UE1 on RB1 through RB20 first before considering scheduling UE1 on the non-indicated RBs.

In another example, CoMP eNB1 can indicate to CoMP eNB2 via an ABS Pattern that every other subframe will be an ABS for the next 40 ms. In response, CoMP eNB2 can choose to schedule resources for the targeted users on the non-ABS subframes and resources for non-inter-eNB CoMP users on the remaining subframes. This can allow the CoMP eNBs to improve the probability that the scheduling decisions are aligned without directly exchanging the scheduling information.

Similar to the partitioning introduced for non-overlapping PRB allocation, additional ICIC and eICIC techniques can be introduced to mitigate potential interference that can occur due to partial overlap of resource allocations between CoMP eNBs when each of the CoMP eNBs transmits to a different UE. However, unlike non-overlapping PRB allocation, which use a hard or strict partitioning of time or frequency resources, a "soft reuse" strategy may be utilized. In this case, the same RNTP or ABS Patterns may be exchanged over the X2 interface, but the CoMP eNBs can only utilize those RNTP or ABS Patterns on an optional basis.

For example, a first CoMP eNB (such as CoMP eNB1) can indicate to a second CoMP eNB (such as CoMP eNB2) via a RNTP that RB1 through RB20 will be utilized for the next few subframes. In response, CoMP eNB2 can choose to only schedule RBs for the targeted users on those RBs once it has exhausted scheduling opportunities on the remaining un-protected RBs.

In another example, CoMP eNB1 can indicate to CoMP eNB2 via an ABS Pattern that every other subframe will be an ABS for the next 40 ms. In response, CoMP eNB2 can choose to schedule resources for the targeted users on those ABS subframes, but at a lower transmit power than for the non-ABS subframes. Thus, the CoMP eNB2 can reduce, but not fully eliminating inter-eNB interference for those subframes.

An alternative to implementing the previously discussed "soft reuse" operation can be for the CoMP eNBs to utilize an ICIC weighting factor $0 \leq \beta \leq 1$. When $\beta=0$, the CoMP eNB can completely ignore the RNTP or ABS Patterns received from other eNBs and implement independent resources allocation. When $\beta=1$, the CoMP eNB can utilize the RNTP or ABS Patterns received from other eNBs in a strict fashion and implement non-overlapping PRB allocation. For $0<\beta<1$, the CoMP eNBs can balance the suggested partitions from the other eNBs with its own scheduling metrics. The value of $\beta$ can be configured and adjusted independently by each eNB or can be set by the network operator, giving flexibility to adapt to interference and congestion conditions in the network.

As both non-overlapping and at least partial overlapping PRB allocation can provide benefits for different channel conditions, in certain embodiments, it can also be beneficial if higher layer signaling (such as RRC) can be provisioned to configure CoMP eNBs to be enabled with at least one of or both non-overlapping and at least partial overlapping PRB allocation. For example, with non-overlapping PRB allocation or at least partial overlapping PRB allocation, if ICIC or eICIC techniques can be implemented in the network in addition to the inter-eNB CoMP operation, the frequency or time-domain based partitioning information can be implicitly utilized and exchanged between CoMP eNBs. This can be carried out by utilizing the 'Load Indication' and 'Resource Status Reporting Initiation' X2 interface procedures. Alternatively, independent of ICIC or eICIC being configured in the network, the RNTP, or the ABS Patterns can be explicitly indicated and exchanged via a separate X2 coordination message specific to inter-eNB CoMP initialization or configuration.

In certain embodiments, each TB transmitted by a TP can correspond to one or more transmission layers. The number of transmission layers for each TP or rank can be different. Furthermore, the maximum number of transmission layers that can be assigned by the TP to a UE can be the same or fewer than the maximum number of transmission layers that the TP is capable of using. Thus, the total number of transmission layers that a UE can receive for a resource block cannot exceed the UE capability. Accordingly, it may be necessary for all TPs involved in the inter-eNB CoMP JT to be informed about the UE capability.

In certain embodiments, when TPs are transmitting PDSCHs in non-overlapping resource blocks (such as with non-overlapping PRB allocation), the primary CoMP eNB can inform the one or more secondary CoMP eNBs, for example, over the X2 interface, of the maximum number of transmission layers that can be assigned to the UE. In certain embodiments, when the TPs are transmitting PDSCHs in the same set of resource blocks (such as with at least partial overlapping PRB allocation), the sum of the transmission layers by the TPs for the resource blocks cannot exceed the UE capability. To ensure that the sum of the transmission layers by the TPs for the resource blocks do not exceed the UE capability, the maximum number of transmission layers that each TP is allowed to transmit can be coordinated between the TPs beforehand. The coordination between TPs can be performed by messaging over an X2 interface connecting TPs or through a central entity connected to multiple TPs.

Assuming that the primary CoMP eNB is the TP with the largest received power and assuming that the UE is likely to use a rank 2 assignment from the primary CoMP eNB with the largest received power, it can be beneficial to allow the primary CoMP eNB to have priority to determine the maximum number of transmission layers for its own transmission. Similar to the time/frequency resource allocation priority handling for non-overlapping PRB allocation, if there are more than two eNBs (such that N>2), an eNB with the higher received signal power can get the priority to indicate its preferred number of transmission layers over another eNB with relatively lower received signal power. Thus, by denoting eNB n (where n=1, . . . , N) as the eNB with the n-th priority, eNB n can take into account the decisions of eNB 1 to eNB n−1. The priority order of the eNBs can be determined based on the RSRP/CSI-RSRP measured by the UE of the eNBs. Other signal measurement metrics that reflect the received signal strength or channel quality may not be precluded. In certain embodiments, if the RSRP/CSI-RSRP measurement reports are only sent to the primary CoMP eNB, then the primary CoMP eNB can inform the other secondary CoMP eNBs of the priority order. In certain embodiments, if the RSRP/CSI-RSRP measurement reports are sent to all eNBs, then each eNB can determine its own priority from the reports.

When two TBs are enabled, for example in LTE Rel-8-11, typically a first TB (such as TB 1) can be mapped to codeword (CW) 0 and a second TB (such as TB 2) can be mapped to CW 1. However, it is also possible to use the transport block to codeword swap flag of DCI format 2 to swap the transport block to codeword mapping as disclosed in 3GPP TS 36.212 V11.1.0 (2012-12) Section 5.3.3.1.5. In this case, TB 1 can be disabled, TB 2 can be enabled, and TB 2 can also be mapped to CW 0. The codeword index (such as 0 or 1) (besides the cell id and the C-RNTI) can be used to initiate the scrambling sequence used for scrambling the transport block bits.

For inter-eNB CoMP, in certain embodiments, the TBs from each CoMP eNB can be mapped to a CW index. For example, TBs from CoMP eNBs can be mapped to a CW index by assuming that the TB-to-CW mapping is performed as disclosed in the Rel-8 for each PDSCH. In another example, each CoMP eNB can only transmit one TB to the UE. Furthermore, supposing that N=2 (such that there are two TBs, one from the primary CoMP eNB (TB 1) and another from the secondary CoMP eNB (TB 2)), the TB for each PDSCH can be mapped to CW 0 as illustrated below in Table 8. In yet another example, each CoMP eNB can transmit up to 2 TBs, so that the TB-to-CW mapping can be implemented as illustrated below in Table 9.

TABLE 8

Independent TB-to-CW mapping for each eNB. One TB for each eNB.

| Transport block | Codeword index |
| --- | --- |
| Transport block from primary CoMP eNB | Codeword 0 |
| Transport block from secondary CoMP eNB | Codeword 0 |

TABLE 9

Independent TB-to-CW mapping for each eNB. Up to two TBs for each eNB.

| Transport block | Codeword |
| --- | --- |
| Transport block 1 from primary CoMP eNB | Codeword 0 |
| Transport block 2 from primary CoMP eNB | Codeword 1 |
| Transport block 1 from secondary CoMP eNB | Codeword 0 |
| Transport block 2 from secondary CoMP eNB | Codeword 1 |

Given the codeword index (q), the PDSCH can be scrambled with a scrambling sequence initialized by (Section 6.3.1 of 3GPP TS 26.211 V11.1.0 (2012-12):

$$c_{init} = n_{RNTI} \cdot 2^{14} + q \cdot 2^{13} + \lfloor n_s/2 \rfloor \cdot 2^9 + N_{ID}^{cell} \text{ for PDSCH}$$

where $n_{RNTI}$ is the configured RNTI value, q is the codeword index, $n_s$ is the subframe index, and $N_{ID}^{cell}$ is the cell id.

Multiple TBs, for example from multiple TPs, can be mapped to the same codeword index in the same subframe in the same carrier. As a result, the PDSCH scrambling can be performed the same way for different eNB for a given subframe. Scrambling the PDSCHs for different eNB differently (such as uniquely scrambling the PDSCHs) can help with interference randomization. In certain embodiments, scrambling the PDSCHs for different eNBs differently can include configuring a virtual C-RNTI for a UE. In at least this embodiment, the UE can assume that virtual C-RNTI descrambles the PDSCH of one or more secondary eNBs. C-RNTI (as such C-RNTI described in Rel-8) can still be used to descramble the PDSCH of the primary CoMP eNB. In particular, the initialization of the scrambling sequence for PDSCH as specified in Section 6.3.1 of 3GPP TS 36.211 V11.1.0 (2012-12) can be modified so that:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH of } eNB1 \\ n_{VRNTI} \cdot 2^{14} + q \cdot 2^{13} + \lfloor n_s/2 \rfloor \cdot 2^9 + N_{ID}^{cell} & \text{for PDSCH of } eNB2 \end{cases}$$

where $n_{RNTI}$ corresponds to the C-RNTI associated with the PDSCH transmission from the primary CoMP eNB (eNB 1) and $n_{VRNTI}$ corresponds to the virtual C-RNTI associated with the PDSCH transmission from the secondary CoMP eNB (eNB 2). It should be noted that if the single TB from a CoMP eNB is mapped to codeword 0 as illustrated in Table 8, then q can be equal to 0 (such as q=0).

Furthermore, in certain embodiments, the virtual C-RNTI can be used only for scrambling the PDSCH. Additionally, in certain embodiments, the virtual C-RNTI can be the same as the C-RNTI configured for a TP such that the virtual C-RNTI can be used to replace the C-RNTI to determine the UE-specific search space for PDCCH/EPDCCH or to replace the C-RNTI for the scrambling of the CRC of the PDCCH/EPDCCH for the secondary CoMP eNB.

In certain embodiments, scrambling the PDSCHs for different eNBs can include configuring a Virtual cell id for a UE. In at least this embodiment, the UE can assume that virtual C-RNTI descrambles the PDSCH of one or more secondary eNBs. The serving cell id (such as the serving cell id disclosed in Rel-8) can still be used for descrambling the PDSCH of the primary CoMP eNB. In particular, the initialization of the scrambling sequence for PDSCH as specified in Section 6.3.1 of 3GPP TS 36.211 V11.1.0 (2012-12) can be modified so that:

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH of } eNB1 \\ n_{RNTI} \cdot 2^{14} + q \cdot 2^{13} + \lfloor n_s/2 \rfloor \cdot 2^9 + N_{VID}^{cell} & \text{for PDSCH of } eNB2 \end{cases}$$

where $N_{ID}^{cell}$ corresponds to the serving cell id for the primary CoMP eNB (eNB 1) and $N_{VID}^{cell}$ corresponds to the virtual cell id for the secondary CoMP eNB (such that the virtual cell id can be set to be the PCI of the secondary CoMP eNB). It should be noted that if the single TB from a CoMP eNB is mapped to codeword 0 as illustrated in Table 8, then q can be equal to 0 (such as q=0).

In certain embodiments, scrambling the PDSCHs for different eNBs differently can include configuring a virtual C-RNTI and a virtual cell id for a UE.

$$c_{init} = \begin{cases} n_{RNTI} \cdot 2^{14} + q \cdot 2^{13} + \lfloor n_s/2 \rfloor \cdot 2^9 + N_{ID}^{cell} & \text{for PDSCH of } eNB1 \\ n_{VRNTI} \cdot 2^{14} + q \cdot 2^{13} + \lfloor n_s/2 \rfloor \cdot 2^9 + N_{VID}^{cell} & \text{for PDSCH of } eNB2 \end{cases}$$

In certain embodiments, scrambling the PDSCHs for different eNBs can include mapping the TBs from different CoMP eNB to different codeword indexes. For example, suppose there is one TB transmission from a CoMP eNB, then for two TBs, the TB from the primary CoMP eNB can be mapped to CW 0 and the TB from the secondary CoMP eNB can be mapped to CW 1 as illustrated below in Table 10. In another example, suppose there can be up to two TBs per CoMP eNB, then the TBs from the primary CoMP eNB can be mapped to CW 0 and CW1, while the TBs from the secondary CoMP eNB can be mapped to CW 2 and CW3, as illustrated below in Table 11. In certain embodiments, the TB-to-CW mapping method illustrated in Table 8 or Table 9 can be beneficial for non-overlapping PRB allocation while the TB-to-CW mapping method in Table 10 or Table 11 can be beneficial for at least partial overlapping PRB allocation. Higher layer signaling can be used to switch UE assumption between Table 8 or Table 9 and Table 10 or Table 11.

TABLE 10

TB-to-CW mapping assuming one TB from a TP for 2 TPs

| Transport block | Codeword |
|---|---|
| Transport block from primary CoMP eNB | Codeword 0 (q = 0) |
| Transport block from secondary CoMP eNB | Codeword 1 (q = 1) |

TABLE 11

TB-to-CW mapping assuming multiple TBs from a TP for 2 TPs

| Transport block | Codeword |
|---|---|
| Transport block 1 from primary CoMP eNB | Codeword 0 (q = 0) |
| Transport block 2 from primary CoMP eNB | Codeword 1 (q = 1) |
| Transport block 1 from secondary CoMP eNB | Codeword 2 (q = 2) |
| Transport block 2 from secondary CoMP eNB | Codeword 3 (q = 3) |

In certain embodiments, as the UE can be expected to receive multiple PDSCHs in a subframe, the UE can also determine how to descramble each PDSCH received. In certain embodiments, the UE can receive a PDSCH indicating a particular descrambling assumption though dynamic signaling in PDCCH/EPDCCH. For example, the UE can receive a PDSCH indicating a particular descrambling assumption through dynamic signaling in PDCCH/EPDCCH using at least one of the virtual C-RNTI, the virtual cell id, or a codeword index. In certain embodiments, the PDSCH indicating a particular descrambling assumption can also be done implicitly. For example, if the virtual C-RNTI was used to verify the PDCCH/EPDCCH CRC checksum, then the PDSCH can also be descrambled assuming the virtual C-RNTI. In certain embodiments, the type of physical control channel can be used to differentiate the PDSCH descrambling assumption. For example, if the control information for the PDSCH was detected in PDCCH, then the PDSCH (such as the Rel. 8 PDSCH) descrambling can be assumed by the UE. Conversely, if the control information was detected in EPDCCH, then new PDSCH descrambling (such as using at least one of the virtual C-RNTI, the virtual cell id, or a codeword index) can be assumed by the UE instead. In certain embodiments, different EPDCCH sets that can indicate different PDSCH descrambling assumptions can be configured via higher layer signaling.

While the above embodiment is concerning with codeword mapping and PDSCH scrambling, similar principles can be used to enable differentiation of primary and secondary CoMP eNBs by the UE.

In certain embodiments, in order to avoid physical control channel interference between eNBs, the physical control channels can be monitored by the UE so that different CoMP eNB do not overlap in time and frequency. In certain embodiments, monitoring, by the UE, physical control channels so that different CoMP eNBs do not overlap in time and frequency can include transmitting DCI from the primary CoMP eNB in the PDCCH and transmitting DCI from a secondary CoMP eNB in an EPDCCH within an EPDCCH set. In certain embodiments, monitoring, by the UE, physical control channels so that different CoMP eNBs do not overlap in time and frequency can include transmitting DCI from the primary CoMP eNB in an EPDCCH within a first EPDCCH set and transmitting the DCI from a secondary CoMP eNB in an EPDCCH within a second EPDCCH set. In at least the embodiment including two different EPDCCH sets, the two EPDCCH sets may not be assumed to be quasi co-located by the UE. The CRS rate matching assumptions may also be different for different EPDCCH set.

In certain embodiments, assuming only one codeword is allowed to be transmitted from a CoMP eNB but multi-layer transmission from a CoMP eNB is supported, codeword-to-layer mapping cannot be supported because single codeword-to-layer mapping (such as in Rel. 11) is only applicable for retransmission. However, in certain embodiments, codeword when only one codeword is allowed to be transmitted from a CoMP eNB while multi-layer transmission from a CoMP eNB can be supported because inter-eNB CoMP JT is configured (such as a new transmission mode), then the single codeword-to-multiple layers mappings can be used for the initial transmission. The codeword-to-layer mapping for spatial multiplexing as illustrated below in Table 12 (and modified from Table 6.3.3.2-1 in 3GPP TS 36.211 V11.1.0 (2012-12)) can be applicable for each CoMP eNB in the inter-eNB CoMP operation for both initial transmission and retransmission.

TABLE 12

Codeword-to-layer mapping for spatial multiplexing for inter-eNB CoMP

| Number of layers | Number of codewords | Codeword-to-layer mapping $i = 0, 1, \ldots, M_{symb}^{layer} - 1$ | |
|---|---|---|---|
| 1 | 1 | $x^{(0)}(i) = d^{(0)}(i)$ | $M_{symb}^{layer} = M_{symb}^{(0)}$ |
| 2 | 1 | $x^{(0)}(i) = d^{(0)}(2i)$ $x^{(1)}(i) = d^{(0)}(2i + 1)$ | $M_{symb}^{layer} = M_{symb}^{(0)}/2$ |
| 3 | 1 | $x^{(0)}(i) = d^{(0)}(3i)$ $x^{(1)}(i) = d^{(0)}(3i + 1)$ $x^{(2)}(i) = d^{(0)}(3i + 2)$ | $M_{symb}^{layer} = M_{symb}^{(0)}/3$ |
| 4 | 1 | $x^{(0)}(i) = d^{(0)}(4i)$ $x^{(1)}(i) = d^{(0)}(4i + 1)$ $x^{(2)}(i) = d^{(0)}(4i + 2)$ $x^{(3)}(i) = d^{(0)}(4i + 3)$ | $M_{symb}^{layer} = M_{symb}^{(0)}/4$ |

As previously discussed, DCI formats can be used as an indication for a DM-RS port for a particular CoMP eNB. As previously discussed, a new DCI format (which can be referred to as DCI format 2B') can be modified such that the modulation and coding scheme (MCS), NDI and RV information bits (for a total of 8 bits) for the second transport block can be replaced with one bit to indicate the DM-RS port as previously illustrated in Table 5. Furthermore, Table 13 illustrates an embodiment of information that can be transmitted by means of the DCI format 2B'.

TABLE 13

The following information is transmitted by means of the DCI format 2B':
Carrier indicator - 0 or 3 bits. The field is present according to the definitions in [3GPP TS 36.213].
Resource allocation header (resource allocation type 0/type 1) - 1 bit as defined in section 7.1.6 of [3GPP TS 36.213]

TABLE 13-continued

If downlink bandwidth is less than or equal to 10 PRBs, there is no resource allocation
header and resource allocation type 0 is assumed.
Resource block assignment:
For resource allocation type 0 as defined in section 7.1.6.1 of [3GPP TS 36.213]
$\lceil N_{RB}^{DL}/P \rceil$ bits provide the resource allocation
For resource allocation type 1 as defined in section 7.1.6.2 of [3GPP TS 36.213]
$\lceil \log_2(P) \rceil$ bits of this field are used as a header specific to this resource allocation type
to indicate the selected resource blocks subset
1 bit indicates a shift of the resource allocation span
$(\lceil N_{RB}^{DL}/P \rceil - \lceil \log_2(P) \rceil - 1)$ bits provide the resource allocation
where the value of P depends on the number of DL resource blocks as indicated in section
[7.1.6.1] of [3GPP TS 36.213]
TPC command for PUCCH - 2 bits as defined in section 5.1.2.1 of [3GPP TS 36.213]
Downlink Assignment Index (this field is present in TDD for all the uplink -downlink
configurations and only applies to TDD operation with uplink -downlink configuration 1-
6. This field is not present in FDD) - 2 bits
HARQ process number - 3 bits (FDD), 4 bits (TDD)
Scrambling identity- 1 bit as defined in section 6.10.3.1 of [3GPP TS 36.211]
SRS request - [0-1] bit. This field can only be present for TDD and if present is defined in
section 8.2 of [3GPP TS 36.213]
In addition, for transport block 1:
Modulation and coding scheme - 5 bits as defined in section 7.1.7 of [3GPP TS 36.213]
New data indicator - 1 bit
Redundancy version - 2 bits
Antenna port(s) - 1 bit
HARQ-ACK resource offset (this field is present when this format is carried by EPDCCH.
This field is not present when this format is carried by PDCCH) - 2 bits as defined in
section 10.1 of [3GPP TS 36.213]
Transport block 1 is mapped to codeword 0.
If the number of layers equals one, the antenna port for single-antenna port transmission is
according to Table 5.
If the number of layers equals two, antenna ports 7 and 8 are used for spatial multiplexing.

DCI format X can be constructed by removing the MCS, NDI and RV information bits (total of 8 bits) for the second transport block of a legacy DCI format 2D, or by adding a new field of one or more antenna ports and scrambling the identity and the number of layers to the legacy DCI format 1/1A. The table indicating antenna port(s), the scrambling identity, and the number of layers can be replaced with Table 6 or Table 7 previously illustrated. The transport block can be mapped to codeword 0. The codeword-to-layer mapping is specified according to Table 12. Table 14 below illustrates an of a DCI format X definition obtained by modifying DCI format 1/2D.

TABLE 14

The following information is transmitted by means of the DCI format X:
Carrier indicator - 0 or 3 bits. The field is present according to the definitions in [3GPP TS
36.213].
Resource allocation header (resource allocation type 0/type 1) - 1 bit as defined in section
7.1.6 of [3GPP TS 36.213]
If downlink bandwidth is less than or equal to 10 PRBs, there is no resource allocation
header and resource allocation type 0 is assumed.
Resource block assignment:
For resource allocation type 0 as defined in section 7.1.6.1 of [3GPP TS 36.213]
$\lceil N_{RB}^{DL}/P \rceil$ bits provide the resource allocation
For resource allocation type 1 as defined in section 7.1.6.2 of [3GPP TS 36.213]
$\lceil \log_2(P) \rceil$ bits of this field are used as a header specific to this resource allocation type to
indicate the selected resource blocks subset
1 bit indicates a shift of the resource allocation span
$(\lceil N_{RB}^{DL}/P \rceil - \lceil \log_2(P) \rceil - 1)$ bits provide the resource allocation
where the value of P depends on the number of DL resource blocks as indicated in section
[7.1.6.1] of [3GPP TS 36.213]
TPC command for PUCCH - 2 bits as defined in section 5.1.2.1 of [3GPP TS 36.213]
Downlink Assignment Index (this field is present in TDD for all the uplink -downlink
configurations and only applies to TDD operation with uplink -downlink configuration 1-
6. This field is not present in FDD) - 2 bits
HARQ process number - 3 bits (FDD), 4 bits (TDD)
Antenna port(s), scrambling identity and number of layers - 3 bits as specified in Error!
Reference source not found. or Error! Reference source not found. where nSCID is the
scrambling identity for antenna ports 7 and 8 (Error! Reference source not found.) or
antenna ports 9 and 10 (Error! Reference source not found.) defined in section 6.10.3.1
of [3GPP TS 36.211]
SRS request - [0-1] bit. This field can only be present for TDD and if present is defined in
section 8.2 of [3GPP TS 36.213]
In addition, for transport block 1:
Modulation and coding scheme - 5 bits as defined in section 7.1.7 of [3GPP TS 36.213]
New data indicator - 1 bit
Redundancy version - 2 bits
PDSCH RE Mapping and Quasi-Co-Location Indicator - 2 bits as defined in sections 7.1.9

TABLE 14-continued and 7.1.10 of [3GPP TS 36.213]
HARQ-ACK resource offset (this field is present when this format is carried by EPDCCH.
This field is not present when this format is carried by PDCCH) - 2 bits as defined in
section 10.1 of [3GPP TS 36.213]
Transport block 1 is mapped to codeword 0. The codeword-to-layer mapping is specified
according to Error! Reference source not found..
If the number of information bits in format X carried by PDCCH belongs to one of the sizes
in
Table 5.3.3.1.2-1 of [3GPP TS 36.212], one zero bit shall be appended to format X.

In certain embodiments, various functions described above (such as the various eNB coordination methods) are implemented or supported by computer programs, each of which is formed from computer readable program code and embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

None of the description in this application should be read as implying that any particular element, step, or function is an essential element that must be included in the claim scope: the scope of patented subject matter is defined only by the claims. Moreover, none of these claims is intended to invoke paragraph six of 35 USC §112 unless the exact words "means for" are followed by a participle.

What is claimed is:

1. A method of executing inter-eNodeB (eNB) coordinated multi point (CoMP) joint transmission (JT) between a CoMP user equipment (UE) and two or more CoMP eNBs, the method comprising:
generating, by a CoMP eNB of the two or more CoMP eNBs, a set of downlink control information (DCI), wherein the set of DCI comprises information regarding a mapping relation between a transport block (TB) transmitted by the CoMP eNB and a codeword related to a scrambling of the TB;
transmitting, by the CoMP eNB, the set of DCI to the CoMP UE, wherein the codeword is used to initiate a scrambling sequence being used for scrambling bits of the TB.

2. The method of claim 1, wherein each of the two or more CoMP eNBs are configured to transmit the TB to the CoMP UE on a same carrier, and wherein each TB is carried by a physical downlink shared channel (PDSCH) associated with the CoMP eNB.

3. The method of claim 1, wherein each of the two or more CoMP eNBs are configured to transmit another TB to the CoMP UE on the same carrier, wherein the other TB is carried by a physical downlink shared channel (PDSCH) associated with the CoMP eNB.

4. The method of claim 1, further comprising initiating an inter-eNB CoMP JT:

by configuration of a new transmission mode; or
when the CoMP UE recognizes a simultaneous configuration of multiple transmission modes for a single carrier.

5. A coordinated multi point (CoMP) eNodeB (eNB) configured to execute an inter-eNB CoMP joint transmission (JT) between a CoMP user equipment (UE) and two or more CoMP eNBs, the CoMP eNB comprising:
a
processor configured to generate a set of downlink control information (DCI), wherein the set of DCI comprises information regarding a mapping relation between a transport block (TB) transmitted by the CoMP eNB and a codeword related to a scrambling of the TB; and
a transceiver configured to transmit the set of DCI to the CoMP UE,
wherein the codeword is used to initiate a scrambling sequence being used for scrambling bits of the TB.

6. The CoMP eNB of claim 5, wherein
each of the two or more CoMP eNBs is configured to transmit the TB to the CoMP UE on a same carrier, and wherein
each TB is carried by a physical downlink shared channel (PDSCH) associated with the CoMP eNB.

7. The CoMP eNB of claim 5, wherein each of the two or more CoMP eNBs is configured to transmit another transport block to the CoMP UE on a same carrier, and wherein the other TB is carried by a physical downlink shared channel (PDSCH) associated with the CoMP eNB.

8. The CoMP eNB of claim 5, wherein the processor is configured to initiate the inter-eNB CoMP JT:
by configuring a new transmission mode; or
when the CoMP UE recognizes a simultaneous configuration of multiple transmission modes for a single carrier.

9. A coordinated multi point (CoMP) UE configured to execute inter-eNB CoMP joint transmission (JT) between the CoMP UE and two or more CoMP eNBs, the UE comprising:
one or more processors configured to manage the inter-eNB CoMP JT from two or more CoMP eNBs; and
a receiver configured to receive, a set of downlink control information (DCI) from a CoMP eNB of the two or more of the CoMP eNBs, wherein the set of DCI comprises information on a mapping relation between a transport block (TB) that is transmitted by the CoMP eNB, and a codeword related to a scrambling of the TB, and wherein the codeword is used to initiated a scrambling sequence being used for scrambling bits of the TB.

10. The CoMP UE of claim 9, wherein the receiver is configured to receive, from each of the two or more CoMP eNBs, the TB on a same carrier, and wherein each TB is carried by a physical downlink shared channel (PDSCH) associated with the CoMP eNB.

11. The CoMP UE of claim 9, wherein the receiver is configured to receive another TB from each of the two or more CoMP eNBs on the same carrier, and wherein each TB is carried by a physical downlink shared channel associated with the CoMP eNB.

12. A method for executing inter-eNodeB (eNB) coordinated multi point (CoMP) joint transmission (JT) between a CoMP user equipment (UE) and two or more CoMP eNBs, the method comprising:

Receiving by the CoMP UE, a set of downlink control information (DCI) from a CoMP eNB of the two or more CoMP eNBs, wherein the set of DCI comprises information regarding a mapping relation between a transport block (TB) that is transmitted by the CoMP eNB and a codeword related to a scrambling of the TB, and wherein the codeword is used to initiate a scrambling sequence being used for scrambling bits of the TB.

13. The method of claim 12, wherein the CoMP UE is configured to receive the TB from each of the two or more CoMP eNBs on a same carrier, and wherein each TB is carried by a physical downlink shared channel (PDSCH) associated with the CoMP eNB.

14. The method of claim 12, wherein the CoMP UE is configured to receive another TB from each of the two or more CoMP eNBs on a same carrier, and wherein the other TB is carried by a physical downlink shared channel (PDSCH) associated with the CoMP eNB.

15. The method of claim 12, further comprising initiating inter-eNB CoMP JT:

by configuring a new transmission mode; or when the CoMP UE recognizes a simultaneous configuration of multiple transmission modes for a single carrier.

* * * * *